United States Patent
Keener

(10) Patent No.: US 10,589,342 B2
(45) Date of Patent: Mar. 17, 2020

(54) METHOD OF FORMING A HIGHLY-DEFORMABLE TITANIUM OR TITANIUM-ALLOY ONE-PIECE FASTENER

(71) Applicant: The Boeing Company, Chicago, IL (US)

(72) Inventor: Steven G. Keener, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 475 days.

(21) Appl. No.: 15/479,848

(22) Filed: Apr. 5, 2017

(65) Prior Publication Data
US 2017/0203356 A1    Jul. 20, 2017

Related U.S. Application Data

(62) Division of application No. 14/569,031, filed on Dec. 12, 2014, now Pat. No. 9,649,682, which is a division
(Continued)

(51) Int. Cl.
*B21K 1/60* (2006.01)
*B21K 1/58* (2006.01)
(Continued)

(52) U.S. Cl.
CPC ............... *B21K 1/60* (2013.01); *B21J 15/02* (2013.01); *B21K 1/58* (2013.01); *F16B 5/04* (2013.01);
(Continued)

(58) Field of Classification Search
CPC .... B21K 1/58; B21K 1/60; B21K 1/62; F16B 5/04; B21J 15/02; B21J 15/04; B21J 15/041
See application file for complete search history.

(56) References Cited

U.S. PATENT DOCUMENTS 3,126,561 A    3/1964   Orloff
3,626,531 A *  12/1971  Mazer et al. ............ B21J 15/02
                                                148/607
(Continued)

FOREIGN PATENT DOCUMENTS

CN    101404911       4/2009
CN    201568418 U     9/2010
(Continued)

OTHER PUBLICATIONS

Japanese Office Action for Application No. 2012-252251, dated May 16, 2017.
(Continued)

*Primary Examiner* — Edward T Tolan

(57) ABSTRACT

A method of forming a fastener includes inserting a blank precursor into a bore of a forming die having an enlarged bore portion, applying a first axial compression force to the blank precursor, and forming a cold-worked head section and an enlarged shank portion on the blank precursor corresponding to the enlarged bore portion. The enlarged shank portion has a nominal shank portion extending therefrom. The method additionally includes inserting the nominal shank portion into a bore of a final reduction die, applying a second axial compression force to the enlarged shank portion, and urging the enlarged shank portion into the bore of the final reduction die. The method includes reducing a cross-sectional area of the enlarged shank portion by approximately 2 to 5 percent to form a cold-worked shank section.

19 Claims, 14 Drawing Sheets

Related U.S. Application Data of application No. 13/299,228, filed on Nov. 17, 2011, now abandoned.

(51) Int. Cl.
  *F16B 19/06* (2006.01)
  *F16B 5/04* (2006.01)
  *B21J 15/02* (2006.01)

(52) U.S. Cl.
  CPC ......... *F16B 19/06* (2013.01); *Y10T 29/49956* (2015.01)

(56) References Cited

U.S. PATENT DOCUMENTS

| | | | |
|---|---|---|---|
| 3,911,783 | A | 10/1975 | Gapp |
| 3,975,786 | A * | 8/1976 | Gapp ..................... B21K 1/58 470/31 |
| 3,995,406 | A | 12/1976 | Rosman |
| 4,023,225 | A * | 5/1977 | Tochilkin ................. B21J 3/00 470/11 |
| 4,126,076 | A | 11/1978 | Rosman |
| 4,223,433 | A | 9/1980 | Rosman |
| 4,861,211 | A | 8/1989 | Dunsmore |
| 5,333,980 | A | 8/1994 | Pratt |
| 6,274,200 | B1 | 8/2001 | Keener |
| 6,499,926 | B2 | 12/2002 | Keener |
| 6,638,381 | B2 | 10/2003 | Keener |
| 6,726,085 | B2 | 4/2004 | Litwinski |
| 6,865,919 | B2 | 3/2005 | Litwinski |
| 6,912,885 | B2 | 7/2005 | Keener |
| 7,077,755 | B2 | 7/2006 | Keener |
| 7,241,328 | B2 | 7/2007 | Keener |
| 7,465,234 | B2 | 12/2008 | Keener |
| 7,513,728 | B1 | 4/2009 | Seace |
| 7,654,909 | B2 | 2/2010 | Keener |
| 7,785,530 | B2 | 8/2010 | Keener |
| 7,922,841 | B2 | 4/2011 | Bampton |
| 2004/0086328 | A1 | 5/2004 | Babej |
| 2004/0247835 | A1 | 12/2004 | Keener |
| 2006/0177284 | A1 | 8/2006 | Keener |
| 2008/0089802 | A1 | 4/2008 | Keener |

FOREIGN PATENT DOCUMENTS

| | | |
|---|---|---|
| CN | 201836171 | 5/2011 |
| JP | S48059242 | 8/1973 |
| JP | S52009613 | 1/1977 |
| JP | H04502798 | 5/1992 |
| JP | 2008-281209 | 6/2001 |
| JP | 2005194550 | 7/2005 |
| JP | 2001-173624 | 11/2008 |

OTHER PUBLICATIONS

Extended European Search Report for Application No. 12192230.6, dated Jun. 17, 2015.
Canadian Office Action for Application No. 2,792,752, dated Sep. 18, 2015.
Chinese Office Action for Application No. 2012104678556, dated Sep. 6, 2015.
Chinese Office Action for Application No. 2012104678556, dated Jul. 5, 2016.
Chinese Office Action for Application No. 2016122802157660 dated Jan. 3, 2017.
Japanese Office Action for Application No. 2012-252251, dated Aug. 23, 2016.
European Office Action for Application No. 12192230.6, dated Feb. 20, 2018.
European Office Action for Application No. 12192230.6, dated Oct. 9, 2019.
Brazilian Patent Office, Brazilian Office Action for Application No. BR102012029191-6, dated Dec. 9, 2019.
EPO, European Office Action for Application No. 12192230.6, dated Dec. 13, 2018.
Chinese Patent Office, Chinese Office Action for Chinese Application No. 2012104678556, dated Jun. 2, 2017.

* cited by examiner

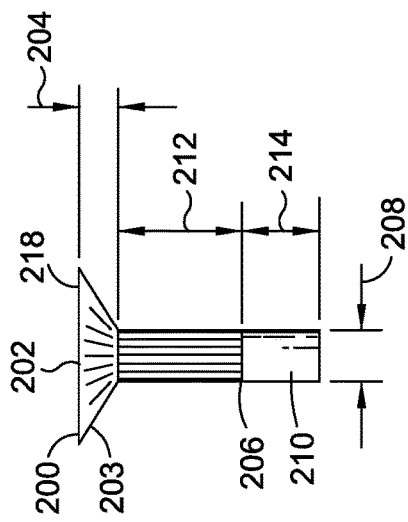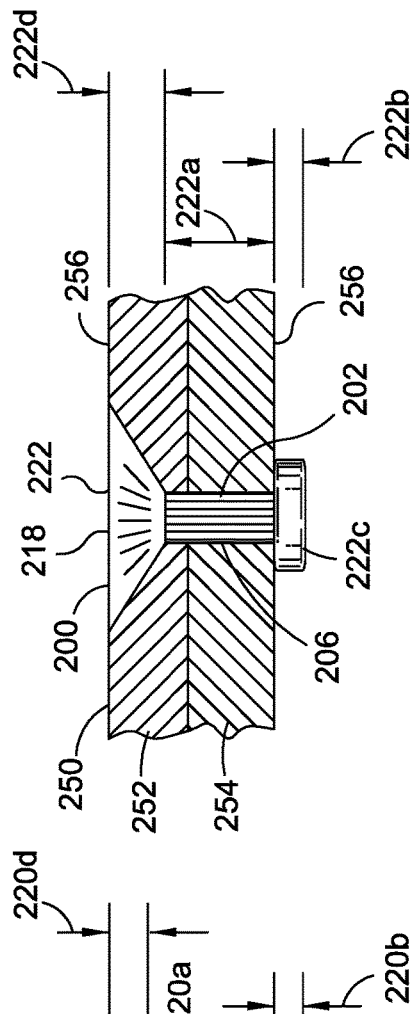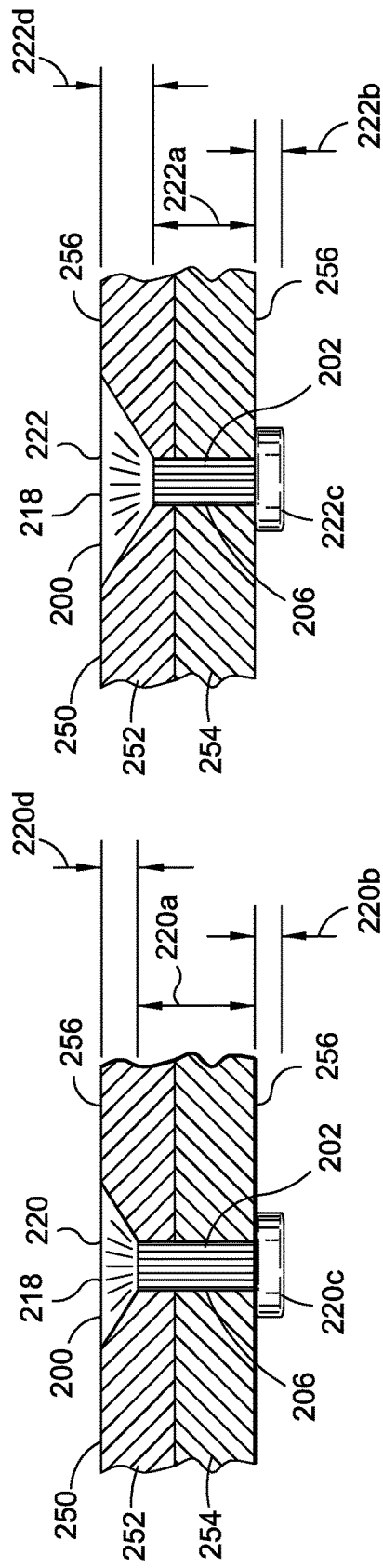

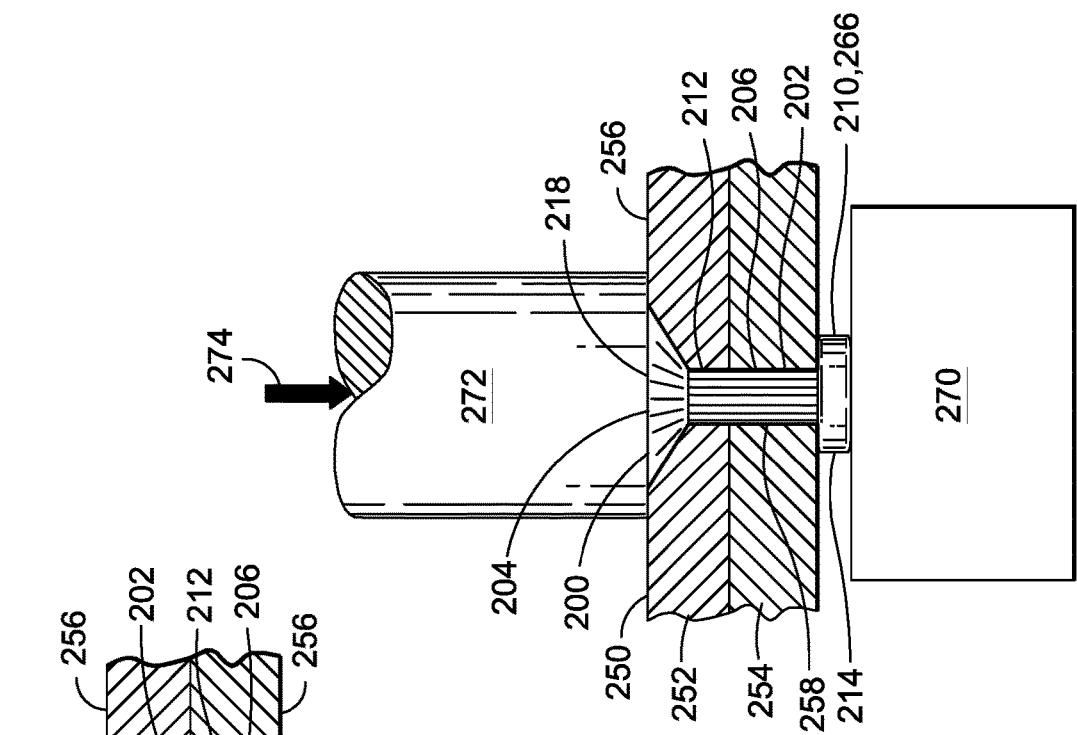
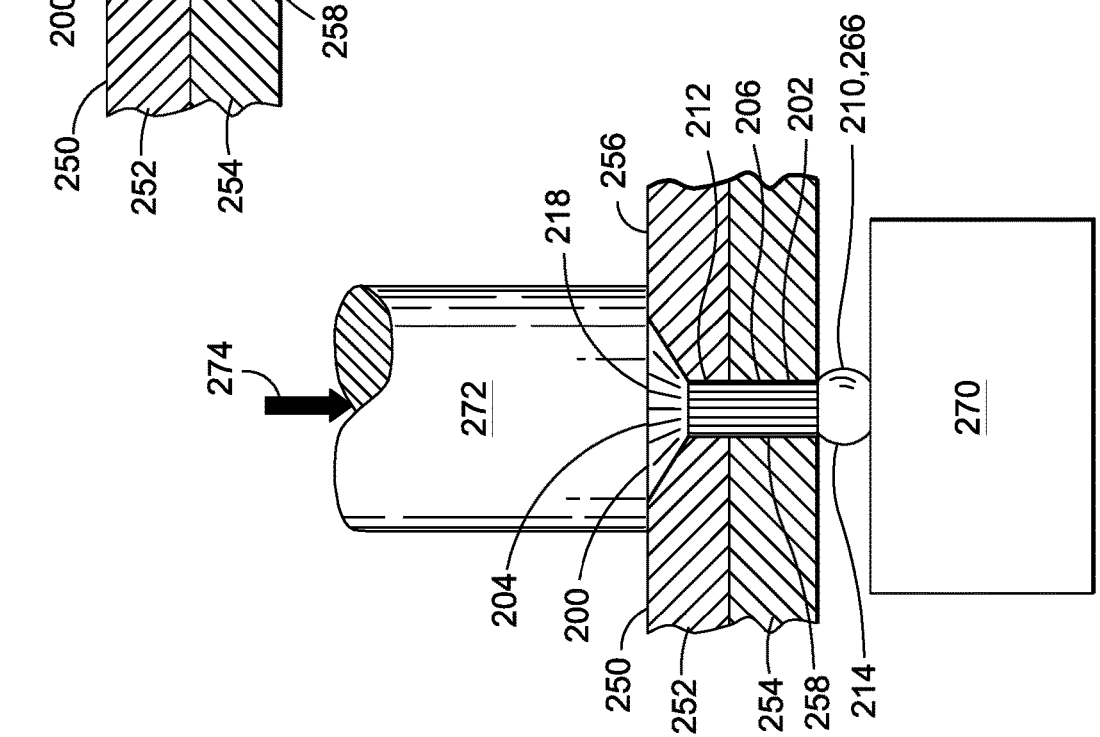

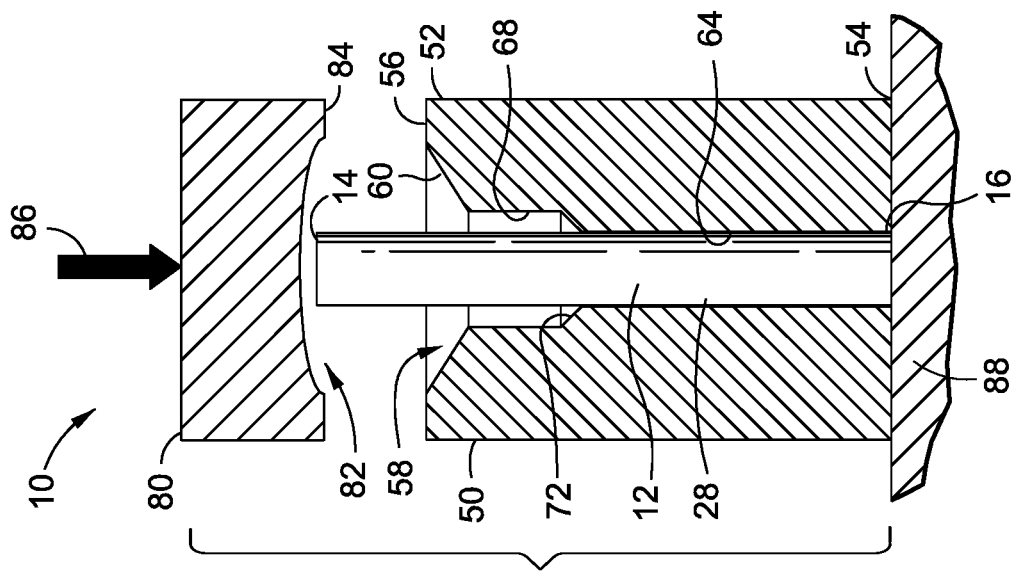
FIG. 17
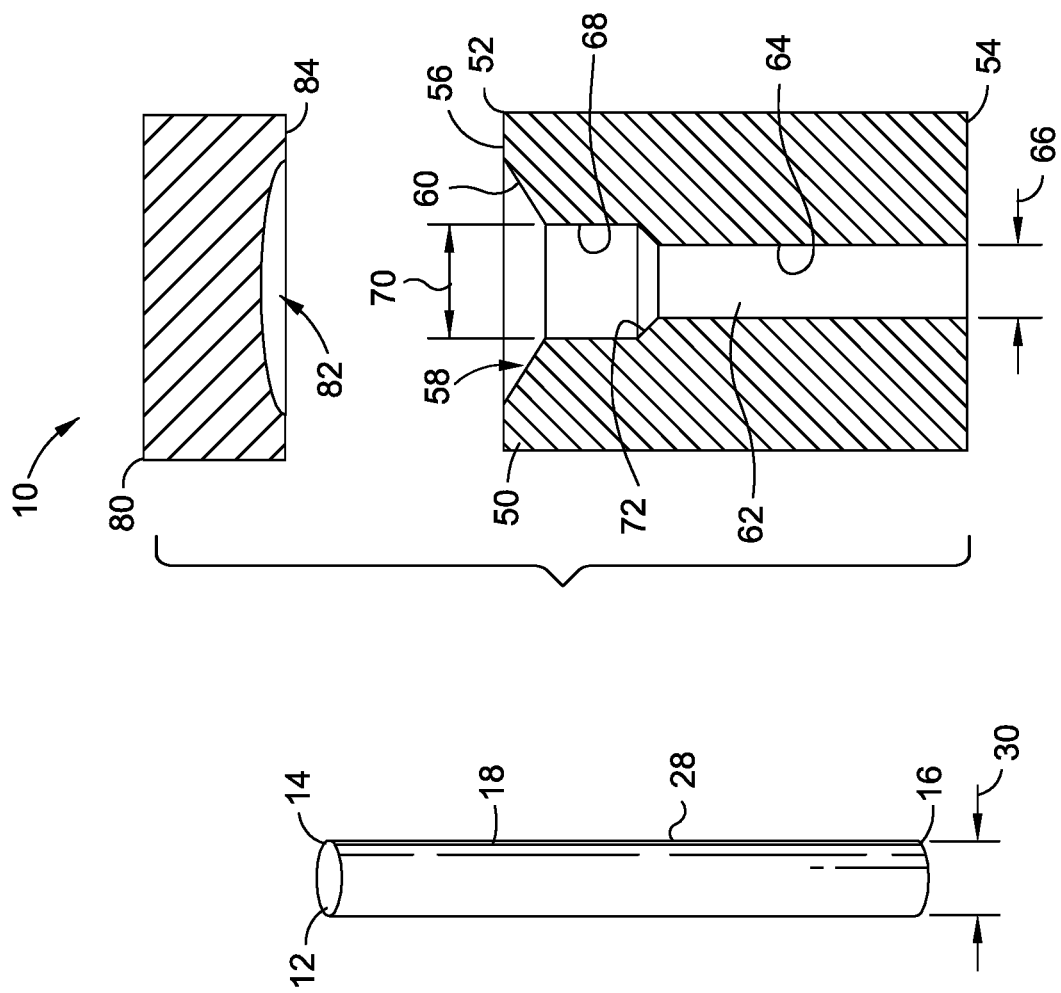
FIG. 16
FIG. 15

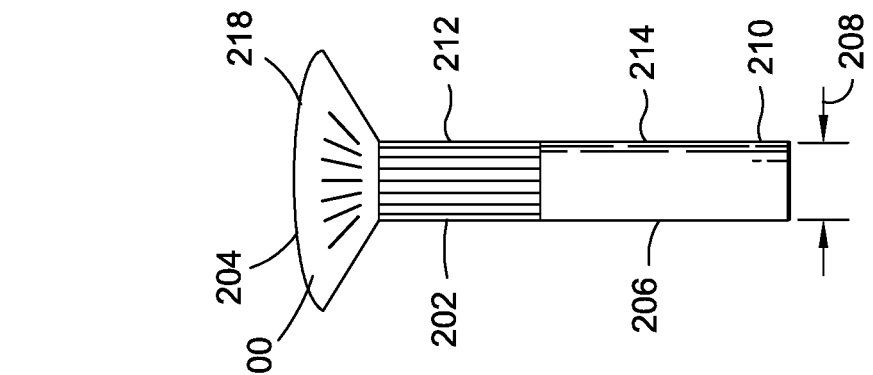
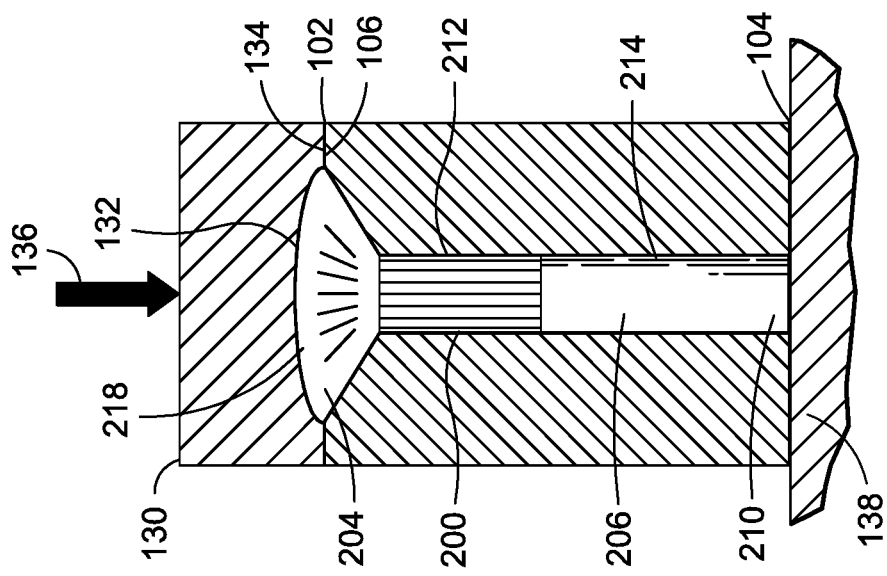
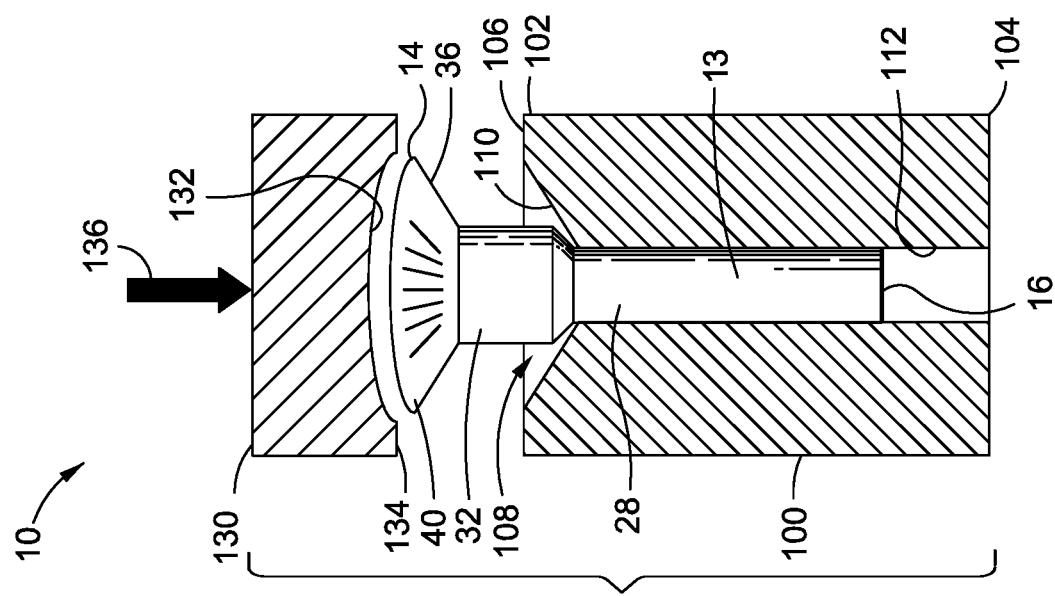

METHOD OF FORMING A HIGHLY-DEFORMABLE TITANIUM OR TITANIUM-ALLOY ONE-PIECE FASTENER

CROSS-REFERENCE TO RELATED APPLICATIONS

The present application is a divisional application of and claims priority to pending U.S. application Ser. No. 14/569,031 filed on Dec. 12, 2014, and entitled METHOD FOR PREPARING HIGHLY-DEFORMABLE TITANIUM AND TITANIUM-ALLOY ONE-PIECE FASTENERS, which is a divisional application of and claims priority to U.S. application Ser. No. 13/299,228 filed on Nov. 17, 2011, and entitled METHOD FOR PREPARING HIGHLY-DEFORMABLE TITANIUM AND TITANIUM-ALLOY ONE-PIECE FASTENERS AND FASTENERS PREPARED THEREBY, the entire contents of each one of the above-referenced applications being expressly incorporated by reference herein.

FIELD

The present disclosure relates generally to fasteners and, more particularly, to a system and method for preparing a one-piece fastener having a locally cold-worked section.

BACKGROUND

Mechanical fasteners are widely used for joining two or more components of a structural assembly. For example, mechanical fasteners are used extensively for joining the structural components of an airframe. Two-piece fasteners are used in a variety of applications including applications where tension loads in the fastener are relatively high. Such two-piece fasteners may include a bolt or a pin that is inserted into a hole and a threaded nut or swage collar that may be mechanically secured to threads or other features formed on the free end of the bolt or pin. By tightening the nut or collar against the structure, the components of the structural assembly may be clamped together.

Although two-piece fasteners generally provide relatively high clamp-up and tension load-carrying capability, two-piece fasteners suffer from several drawbacks that detract from their overall utility. For example, due to the need to fabricate, process, and store a large quantity of each component of the system that comprise two-piece fastener systems, procurement costs are relatively high. In addition, the time required for installation and assembly of two-piece fasteners in a structure is relatively high and may require separate, unique tools for the various components of the two-piece fastener configurations, which may add to production costs.

Furthermore, the need to handle two separate pieces for each two-piece fastening system adds to the complexity of installation, which may undesirably add to the overall production time considering the relatively large quantity of fasteners (e.g., tens of thousands) that may be installed in a single airframe. Even further, two-piece fasteners may be relatively heavy due to the required size or length of the mating nut or collar to sufficiently engage the threads formed on the end of the pin or bolt to provide adequate clamp-up and tension load-carrying capabilities. Due to the high volume of fasteners utilized in a single airframe, even minor savings in weight, cost, and time associated with the fasteners can results in significant savings over the number of aircraft produced during the life of a program.

As can be seen, there exists a need in the art for a fastener system having reduced complexity of installation and which may be installed in a reduced amount of time while providing strength characteristics that are at least equivalent to conventional two-piece fasteners.

SUMMARY

The above-noted needs associated with two-piece fastener systems are addressed and alleviated by the present disclosure, which, in an embodiment, provides a one-piece fastener system having a head and a shaft or shank extending from the head and terminating at a tail end portion. The shaft or shank may include a cold-worked shank section located adjacent to the head and a ductile shank section extending between the cold-worked shank section and the tail end portion.

Also disclosed is a method of forming a one-piece fastener system. The method may include the step of providing a blank precursor having opposing ends. The blank precursor may be inserted into a bore of a forming die. The forming die may have an enlarged bore portion. The method may preferably include applying an additional axial compression force to the blank precursor and cold-working a head onto the blank precursor and forming an enlarged shaft or shank portion on the blank precursor corresponding to the enlarged bore portion of the forming die. A nominal shank portion may extend from the enlarged shank portion. The nominal shank portion may have a diameter that may be approximately equal to a final diameter of the fastener. The method may further include inserting the nominal shank portion into a bore of a final reduction die and applying an axial compression force to the enlarged shank portion. The method may additionally include urging the enlarged shank portion into the bore of the final reduction die and forming a cold-worked shank section by reducing the cross-sectional area of the enlarged shank portion such that the blank precursor is formed into a final fastener configuration.

The present disclosure also includes a method of assembling a structure. The method may include the step of providing a one-piece fastener (e.g., a rivet) having a head and a shank terminating at a tail end portion. The head may comprise a cold-worked head section. The shank may include a cold-worked shank section and a ductile shank section extending from the cold-worked shank section to the tail end portion. The cold-worked head section and cold-worked shank section may have a higher strength than the ductile shank section. The method may additionally include installing the fastener in a hole of the structure and upsetting the tail end portion of the ductile shank section.

The features, functions, and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a schematic side view of an embodiment of a one-piece fastener having a cold-worked head section, a cold-worked shank section, and a ductile shank section extending from the cold-worked shank section to a tail end portion of the fastener;

FIG. 2 is a schematic side view of a flush shear head, one-piece fastener installed in a structure;

FIG. 3 is a schematic side view of a flush tension head, one-piece fastener installed in a structure;

FIG. 11 is a schematic side view of the one-piece fastener having a tool and a bucking bar disposed on opposite ends of the fastener in a pre-installed or intermediate-upset condition;

FIG. 12 is a schematic side view of the one-piece fastener installed in the structure and illustrating the tail end portion of the fastener in a post-upset condition;

FIG. 13 is a schematic side view of the one-piece fastener installed in the structure with the tool and bucking bar removed and illustrating the upset end of the fastener comprising the ductile shank section of the fastener;

FIG. 15 is a perspective view of a blank precursor that may be formed into a flush head, one-piece fastener having the cold-worked head and shank sections as shown in the sequence of operations illustrated in FIGS. 16-23;

FIG. 16 is a schematic side view of a forming die having a countersink and a forming ram for use in cold-working a flush head and forming an enlarged shank portion on the blank precursor;

FIG. 17 is a schematic side view of the blank precursor installed within the forming die prior to the application of an axial compression force to the blank precursor by the forming ram;

FIG. 21 is a schematic side view of the intermediarily-formed blank precursor installed within the final reduction die prior to the application of an axial compression force to the flush head by the reduction ram;

FIG. 22 is a schematic side view of the reduction ram in contact with the final reduction die after application of the axial compression force and the reduction in the size of the enlarged shank portion to form a cold-worked head section and cold-worked shank section of a flush head one-piece fastener;

FIG. 23 is a schematic side view of the final configuration of the flush head, one-piece fastener having the cold-worked head and shank sections formed thereon as a result of the application of the axial compression force;

DETAILED DESCRIPTION

Figure 4:
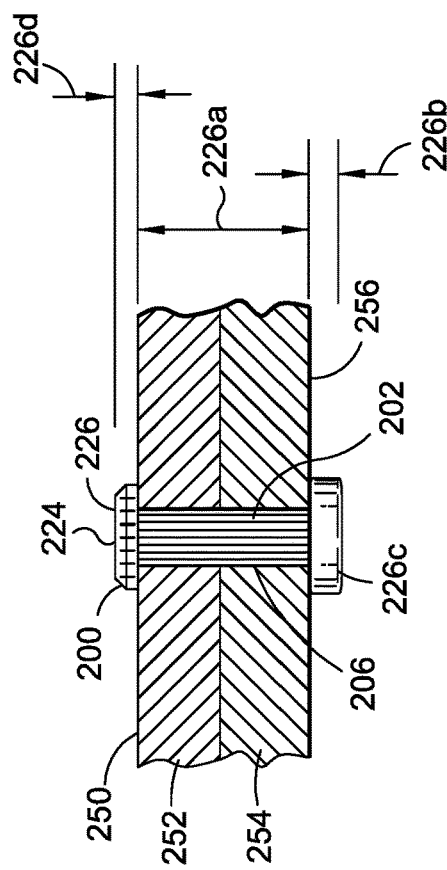
FIG. 4 is a schematic side view of a protruding shear head, one-piece fastener installed in a structure.

Referring now to the drawings wherein the showings are for purposes of illustrating preferred and various embodiments of the disclosure, shown in FIG. 1 is schematic view of an embodiment of a fastener 200 formed in a one-piece fastener configuration. The one-piece fastener 200 (e.g., rivet) has a head 203 and a shaft or shank 206. The shank 206 extends from the head 203 and terminates at a tail end portion 210. The head 203 is cold-worked and comprises a cold-worked head section 204 of the one-piece fastener 200. The shank 206 has a ductile shank section 214 and a cold-worked shank section 212. The cold-worked shank section 212 is also cold-worked and may be located adjacent to the cold-worked head section 204 of the one-piece fastener 200. The ductile shank section 214 may extend from the cold-worked shank section 212 to the tail end portion 210 of the shank 206. Although the shank 206 may be formed with a substantially constant shank diameter 208 along the length of the shank 206, the shank 206 may be intermediarily formed in two or more different diameters (not shown) at different locations along the shank 206.

It should be noted that although the present disclosure describes the one-piece fastener 200 in the context of a rivet, the one-piece fastener 200 may be provided in any one of a variety of configurations, without limitation, and is not limited to a rivet configuration. Even further, the fastener 200 is not limited for use as a one-piece fastener 200. For example, the fastener 200 and its associated forming steps may be applied to and implemented in a multi-piece fastener system, such as in a two-piece fastener system to achieve similar advantageous benefits.

Advantageously, the cold-worked head section 204 and the cold-worked shank section 212 of the fastener 200 have a higher strength than the ductile shank section 214 due to the resulting effects of a cold-working process that may be applied to the head 203 and to a portion of the shank 206 as described in greater detail below. For example, the cold-worked head section 204 and the cold-worked shank section 212 may have a shear strength that is higher than the shear strength of the ductile shank section 214. For a fastener 200 having a titanium or titanium-alloy composition with ultra-fine grain, the cold-worked head section 204 and the cold-worked shank section 212 may have an ultimate shear strength of at least 95 ksi and, more preferably, an ultimate shear strength of at least 100 ksi. The fastener 200 may also have a relatively high tension-carrying capability relative to conventional fasteners due to the process of cold-working the head section 204 and the shank section 212 as described in greater detail below.

Advantageously, the locally increased strength levels in the cold-worked head section 204 and the cold-worked shank section 212 may be achieved without thermal treatment of the fastener 200. The relatively high strength levels in the cold-worked head section 204 and the cold-worked shank section 212 may also be due in part to the use of fastener material having a relatively small average grain size as described below. The relatively small average grain size may be achieved through the use of cryo-milling, equal-angle-extrusion, or other grain size reduction processes. Advantageously, the use of reduced grain size in the fastener 200 such as cryo-milled titanium or titanium-alloy materials results in improved strength, improved formability, and increased elevated temperature stability relative to conventional, titanium or titanium-alloy materials. Additionally, the improved mechanical properties provided by material having relatively small grain size such as reduced, ultra-fine grain material may be achieved without the need for subsequent thermal treatments.

The addition of cold-working the fastener 200 as disclosed herein results in the cold-worked head section 204 and cold-worked shank section 212. The combination of the cold-worked head section 204 and cold-worked shank section 212 with the relatively high mechanical properties provided by relatively small grain size material, such as that of cryo-milled ultra-fine grain material, results in a one-piece fastener 200 having tension and clamp-up capabilities similar to the tension and clamp-up capabilities provided by conventional two-piece fasteners. Advantageously, the ability to use a simple one-piece fastener 200 in place of conventional two-piece fasteners simplifies the fastener installation process, which results in lower fastener installation costs. In addition, the one-piece fastener 200 disclosed herein may have a lower weight (e.g., 30 percent lower) than that of a two-piece fastener having comparable mechanical properties.

The ductile shank section 214 may advantageously have a level of ductility that is higher than the level of ductility of the cold-worked head section 204 and the cold-worked shank section 212. The high level of ductility of the ductile shank section 214 may facilitate the adequate deformation or upsetting of the tail end portion 210 of the fastener 200 during fastener installation (e.g., a riveting or upsetting operation) as described below. The high level of ductility of the ductile shank section 214 may be substantially similar to the high level of ductility of the blank precursor 12 from which the fastener 200 may be formed. More specifically, the high level of ductility of the ductile shank section 214 relative to the ductility of the cold-worked head section 204 and cold-worked shank section 212 may be a result of locally limiting the cold-working of the fastener 200 to the cold-worked head section 204 and cold-worked shank section 212 and avoiding any cold-working of the remainder (i.e., the ductile shank section 214) of the shank 206. In an embodiment, the ductile shank section 214 may have ductility values that facilitate adequately deforming the tail end portion 210 of the fastener 200 without failure or other unacceptable conditions. For example, the ductile shank section 214 may have ductility values of at least approximately 10 percent elongation along a longitudinal axis of the fastener 200 prior to fracturing or failure of the shank 206. The ductile shank section 214 may also have a ductility level represented by a reduction in cross-sectional area of at least approximately 30 percent prior to fracturing or failure of the shank 206.

The relatively high level of ductility of the ductile shank section 214 may be the result of the relatively small grain size of the material from which the fastener 200 (i.e., the blank precursor 12) may be formed. Advantageously, in an embodiment, the fastener 200 may be formed from an ultra-fine grain material having a relatively small average grain size. For example, the fastener 200 may be formed from material having an average grain size of less than approximately 10,000 nanometers (nm) (i.e., less than approximately 10 microns). Such ultra-fine grain material may be produced by a friction stir process and/or by equal-angle-extrusion (EAE), or other process. In a further embodiment, the fastener 200 may be formed from material having an average grain size of less than approximately 500 nanometers (nm) and, more preferably, an average grain size of less than approximately 300 nanometers. For example, the material may have an average grain size of from approximately 100 nanometers to 300 nanometers.

However, the material for forming the fastener 200 is not limited to material having an average grain size of less than approximately 10,000 nanometers, but may be formed from any material having any grain size. For example, the fastener 200 may be formed of material having course grain material described as having an average grain size of greater than approximately 100,000 nanometers. The fastener 200 material may also be formed of material that may described as fine grain material having an average grain size of less than approximately 100,000 nanometers such as between approximately 50,000 to 75,000 nanometers.

In an embodiment, the material for the blank precursor 12 may be formed using a friction stir process (not shown). The friction stir process may use coarse-grained (e.g., average grain size of greater than approximately 100,000 nm) metallic material, such as titanium or titanium-alloy material. The coarse-grained metallic material may be processed using a stirring chamber (not shown) and a stirring tool (not shown). The temperature of the coarse-grained material may be increased as the coarse-grained material is passed through the stirring chamber where the stirring tool stirs the material and using severe mechanical deformation to reduce grain size and improve the homogeneity or uniformity of the microstructure of the material. The material may consolidate upon exiting the stirring chamber resulting in a relatively highly homogeneous material having an ultra-fine grain microstructure.

Alternatively, the grain size of the material from which the blank precursor 12 is formed may be reduced with an equal-angle-extrusion (EAE) process (not shown) wherein the material may be forced through a die having approximately a ninety-degree bend. In an equal-angle-extrusion process, the forcing of the material through the ninety-degree bend results in the mechanical, cold-working of the material. The mechanical, cold-working of the material may reduce the average grain size of the material.

The grain size of the material may also be produced using a cryo-milling process wherein a ball-type, attritor device (not shown) may be used to reduce the size of the microstructure of the material. Material may be attrited into a relatively fine grain powder slurry through severe mechanical deformation using the ball-type attritor device. The material may be attrited in liquid hydrogen or nitrogen or other cooling medium. The ultra-fine grain powder material may be consolidated using a hot isostatic pressing (HIP) process or other consolidating processes. The process may result in a material having an ultra-fine, submicron grain microstructure.

For example, titanium and/or titanium-alloy powder may be produced in a cryo-milling process wherein titanium and/or titanium-alloy powder may be blended with other alloy elements in pre-determined amounts or percentages and subjected to the cryo-milling process. As mentioned above, in the cryo-milling process, the metallic-alloy powder mixture may be milled with attritor-type ball-milling equipment using stainless steel balls in a slurry of liquid nitrogen, argon, hydrogen, or other environment. In response to the extreme mechanical deformation of the metallurgical structure of the powder during the cryo-milling process, the chemical composition of the metallic-alloy powder mixture may be altered. For example, during the cryo-milling process, very fine oxides or nitride phases may be produced as a result of the nitrogen, argon, oxygen, or other gas atmosphere of the cryo-milling process. The fine oxides and nitride phases may improve the temperature stability of the resulting submicron, ultra-fine grain size material. In this regard, by using a cryo-milling process, an improved high-strength, stable, ultra-fine grain size powder may be produced. The titanium powder may be degassed and consolidated such as by using a hot isostatic process (HIP), a Ceracon-type forging process, or other consolidation process to provide titanium or titanium-alloy material having an ultra-fine grain microstructure with a high level of homogeneity.

Although the material for forming the fastener 200 is described herein in the context of titanium and titanium-alloy, the fastener 200 (i.e., blank precursor 12) material may be provided in any material composition including, but not limited to, aluminum, aluminum-alloy, steel, steel-alloy such as stainless steel, and any one of a variety of other material compositions, without limitation. Such material compositions may preferably have a relatively small average grain size as described above.

Figure 19:
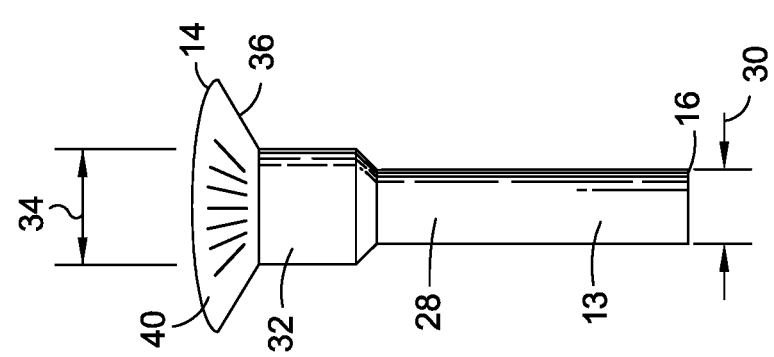
FIG. 19 is a schematic side view of an intermediarily-formed blank precursor having an enlarged shank portion formed thereon as a result of the application of the axial compression force.

Referring still to FIG. 1, the cold-worked head section 204 and the cold-worked shank section 212 of the fastener 200 may be formed by a cold-working process wherein a blank precursor 12 (FIG. 15) of the fastener 200 may be cold-worked. In an embodiment, the cold-working process may comprise cold-working the blank precursor 12 to form the cold-worked head section 204 and simultaneously form an enlarged shank portion 32 (FIG. 19) of an intermediarily-formed blank precursor 13 (FIG. 19). The cold-working process may further comprise locally reducing a cross-sectional area of the enlarged shank portion 32 to form the cold-worked shank section 212 of the fastener 200 as described in greater detail below. In an embodiment, the cross-sectional area of the enlarged shank portion 32 may be reduced by approximately 2 to 5 percent as described in greater detail below. However, the cold-working process may comprise reducing the cross-sectional area of the enlarged shank portion 32 by less than approximately 2 percent or by more than approximately 5 percent. In an embodiment, the cold-working process may comprise reducing the cross-sectional area of the enlarged shank portion 32 by approximately 3.5 percent. In this regard, the enlarged shank diameter 34 of the intermediarily-formed blank precursor 13 (FIG. 19) may be cold-work-reduced to the approximate diameter of the final shank diameter 208 of the fastener 200.

By locally cold-working the head 203 and the shank 206 (FIG. 1), locally increased levels of strength can be achieved in the resulting cold-worked head section 204 and the cold-worked shank section 212 (FIG. 1) while the remaining portion of the shank 206 (i.e., the ductile shank section 214) retains the relatively high levels of ductility (i.e., formability) and durability which facilitate improved performance in fastener 200 (FIG. 1) installations. For example, by locally cold-working the shank 206, the fastener 200 shear strength and tension strength in or adjacent to the cold-worked head section 204 and the cold-worked shank section 212 may be locally increased relative to the strength in the ductile shank section 214 (FIG. 1). Conversely, by limiting the cold-working to the localized cold-worked head section 204 and the cold-worked shank section 212, the ductile shank section 214 of the shank 206 (i.e., the remainder of the shank 206) retains the relatively high level of ductility, formability, and durability that is a result of the relatively small grain size (e.g., ultra-fine grain size) of the material.

Advantageously, for a one-piece fastener 200 configuration such as the rivet shown in FIG. 1, the high level of ductility in the ductile shank section 214 improves fastener 200 installation by providing improved drivability or upsetting of the tail end portion 210 of the rivet through improved elongation, which improves clamp-up subsequently achieved between two or more components 252, 254 (FIG. 2) that may be fastened together by the fastener 200. The relatively high strength levels of the cold-worked head section 204 and the cold-worked shank section 212 may advantageously be achieved without a thermal treatment process (e.g., annealing, artificial aging, etc.) which may significantly reduce fastener 200 fabrication cost and fastener 200 fabrication time. However, as described below, one or more thermal treatments may be included in the process of forming the fastener 200 to enhance or stabilize the cold-worked head section 204 and the cold-worked shank section 212 of the fastener 200 and/or to further improve the mechanical properties of the fastener 200 such as increasing the shear strength of the cold-worked head section 204 and the cold-worked shank section 212.

Additional improvements in the performance of the fastener 200 (FIG. 1) may be achieved by applying a corrosion-inhibiting organic coating 202 (FIG. 1) to the fastener 200. The coating 202 may improve the lubricity of the fastener 200 which may aid in the installation of the fastener 200. The improved lubricity provided by the coating 202 may also avoid the complexity, time, and expense associated with wet-installation of fasteners. The coating 202 may also provide enhanced corrosion protection for the fastener 200 against environmental (e.g., moisture) corrosion, galvanic corrosion, and/or stress corrosion. In an embodiment, the coating 202 may comprise a curable corrosion-resistant, organic coating material that may be applied in solution to the fastener 200 at any time before, during, and/or after the forming of the fastener 200 described below.

In an embodiment, the coating 202 (FIG. 1) may comprise a phenolic resin that may be mixed with one or more plasticizers. The coating 202 may also include organic components such as polytetrafluoroethylene. Inorganic additives may also be included such as aluminum powder and/or strontium chromate. Such coating components and additives may be dissolved in a solvent to facilitate application of the coating 202. The solvent may comprise ethanol, toluene, methyl ethyl ketone (MEK), and/or other solvents. In an embodiment, the coating 202 may be provided in a solution having approximately 30 percent by weight ethanol, approximately 7 percent by weight toluene, and approximately 45 percent by weight methyl ethyl ketone (MEK) as the solvent, and approximately 2 percent by weight strontium chromate, approximately 2 percent by weight aluminum powder. The remainder of the coating composition may comprise phenolic resin and plasticizer as the coating material and a relatively small amount of polytetrafluoroethylene may be included. The coating 202 may be commercially available as Hi-Kote™ 1 from The Hi-Shear Corporation, Torrance, Calif., a division of Lisi Aerospace.

As described below, the coating 202 (FIG. 1) may be applied to the fastener 200 (FIG. 1) by any one of a variety of different methods such as by spraying, dipping, brushing, or by other methods and cured at various elevated temperatures depending upon time. As indicated above, the coating 202 (FIG. 1) may reduce or eliminate the need for lubrication or wet sealants when installing the fastener 200. The coating 202 may also provide sealing of the fastener 200 to the structure 250 (FIG. 2). In addition, the coating 202 may provide increased adherence of paint or other coatings that may be subsequently applied to the fastener 200 as installed or to the fastener 200 heads 204 prior to installation in a structure 250.

Referring now to FIGS. 2-7, shown are several of a wide variety of various embodiments of the fastener 200 that may be formed by the cold-working process disclosed herein and which may be installed in a structure 250. FIG. 2 illustrates a flush shear head fastener 220 installed in a structure 250 for fastening a first component 252 of the structure 250 to a second component 254. The flush shear head fastener 220 has a cold-worked head section 220$d$ and a cold-worked shank section 220$a$ that extends to the ductile shank section 220$b$ of the fastener 220. The cold-worked head section 220$d$ and the cold-worked shank section 220$a$ provide enhanced shear strength to the flush shear head fastener 220. The tail end portion 220$c$ of the flush shear head fastener 220 is included in the ductile shank section 220$b$ of the flush shear head fastener 220. The tail end portion 220$c$ of the flush shear head fastener 220 is adequately deformed or upset against the surface 256 of one of the components 252, 254.

FIG. 3 illustrates a flush tension head fastener 222 installed in a structure 250. The cold-worked head section 222$d$ of the flush tension head fastener 222 has a larger size than the cold-worked head section 220$d$ of the flush shear head fastener 220. The larger size of the cold-worked head section 222$d$ in the flush tension head fastener 222 reduces the length of the cold-worked shank section 222$a$ of the flush tension head fastener 222 relative to the length of the cold-worked shank section 220$a$ of the flush shear head fastener 220 shown in FIG. 2. However, the larger size of the cold-worked head section 222$d$ provides increased tension load-carrying capability to the fastener 222 relative to the tension load-carrying capacity of conventional fasteners and is due to the cold-working that is imparted to the cold-worked head section 222$d$ during the process of forming the cold-worked head section 222$d$ as described below. The tail end portion 222$c$ of the fastener 222 comprises the ductile shank section 222$b$, and is upset against the structure 250 during installation.

Figure 5:
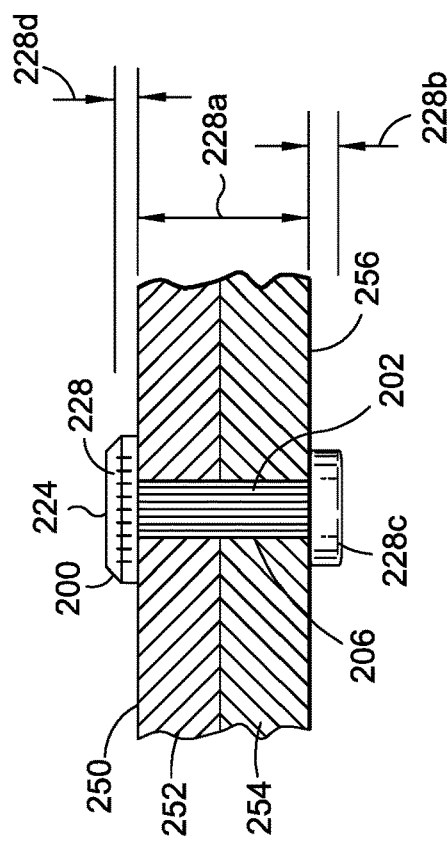
FIG. 5 is a schematic side view of a protruding tension head, one-piece fastener installed in a structure.

FIG. 4-5 illustrate protruding head fasteners 224. FIG. 4 illustrates a protruding shear head fastener 226 installed in a structure 250. The protruding shear head fastener 226 is shown having a cold-worked head section 226$d$ and a cold-worked shank section 226$a$ having a length that is substantially similar to the length 260 (FIG. 9) of the hole 258 or the thickness of the first and second components 252, 254 and which may maximize the shear load-carrying capability of the fastener 224. The ductile shank section 226$b$ of the fastener 226 comprises the tail end portion 226$c$ shown upset against the surface 256 of one of the components 252, 254.

FIG. 5 illustrates a protruding tension head fastener 228 installed in a structure 250, which also has a cold-worked head section 228$d$ and a cold-worked shank section 228$a$ having a length that is substantially similar to the thickness of the structure 250. The cold-worked head section 228$d$ of the protruding tension head fastener 228 in FIG. 5 is larger than the cold-worked head section 226$d$ of the protruding shear head fastener 226 in FIG. 4 which results in an increased tension load-carrying capability. The ductile shank section 228b of the fastener 228 comprises the tail end portion 228c, which is shown upset against the surface 256 of one of the components 252, 254.

Figure 6:
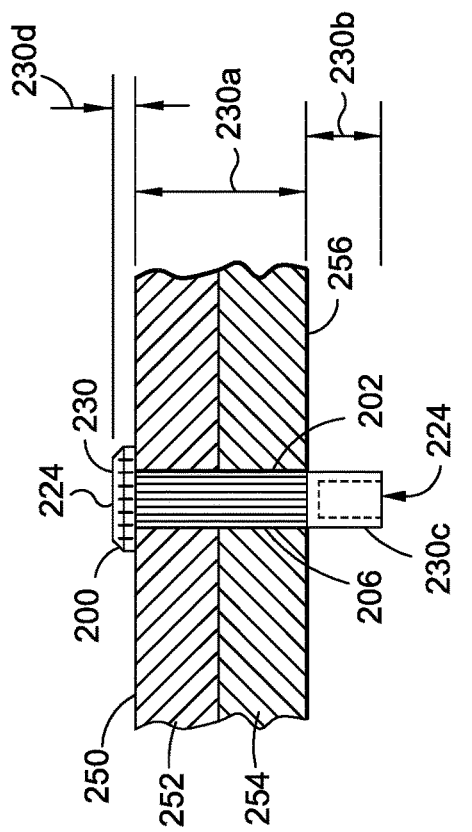
FIG. 6 is a schematic side view of a semi-tubular, one-piece fastener in a structure prior to upsetting the tail end portion of the fastener.
Figure 7:
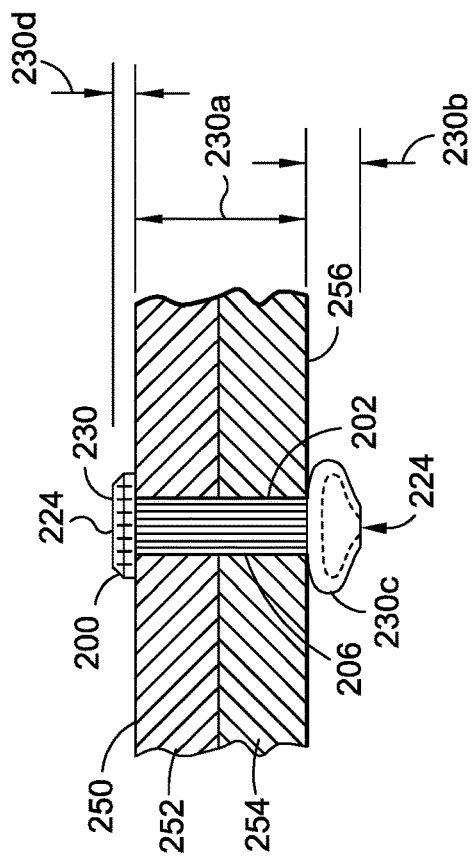
FIG. 7 is a schematic side view of the semi-tubular, one-piece fastener after upsetting the tail end portion of the fastener.

FIGS. 6-7 illustrates a semi-tubular fastener 230 installed in a structure 250. FIG. 6 illustrates the semi-tubular fastener 230 prior to upsetting the tail end portion 230c of the semi-tubular fastener 230. The semi-tubular fastener 230 is shown having a cold-worked head section 230d and a cold-worked shank section 230a having a length that is substantially similar to the thickness of the first and second components 252, 254. FIG. 7 illustrates the semi-tubular fastener 230 after upsetting the tail end portion 230c. The semi-tubular fastener 230 has a generally hollow tubular cavity 22 to reduce the amount of force required to upset the tail end portion 230c of the fastener 230. The ductile shank section 230b of the semi-tubular fastener 230 comprises the tail end portion 230c, which is shown upset against the surface 256 of one of the components 252, 254. Advantageously, the relatively small grain size of the material of the fastener 230 further reduces the amount of force required to upset the tail end portion 230c relative to conventional, one-piece fasteners having a relatively large grain size. As indicated above, FIGS. 2-7 illustrate several of a wide variety of various embodiments of the fastener 200 that may be formed by the cold-working process disclosed herein.

Figure 8:
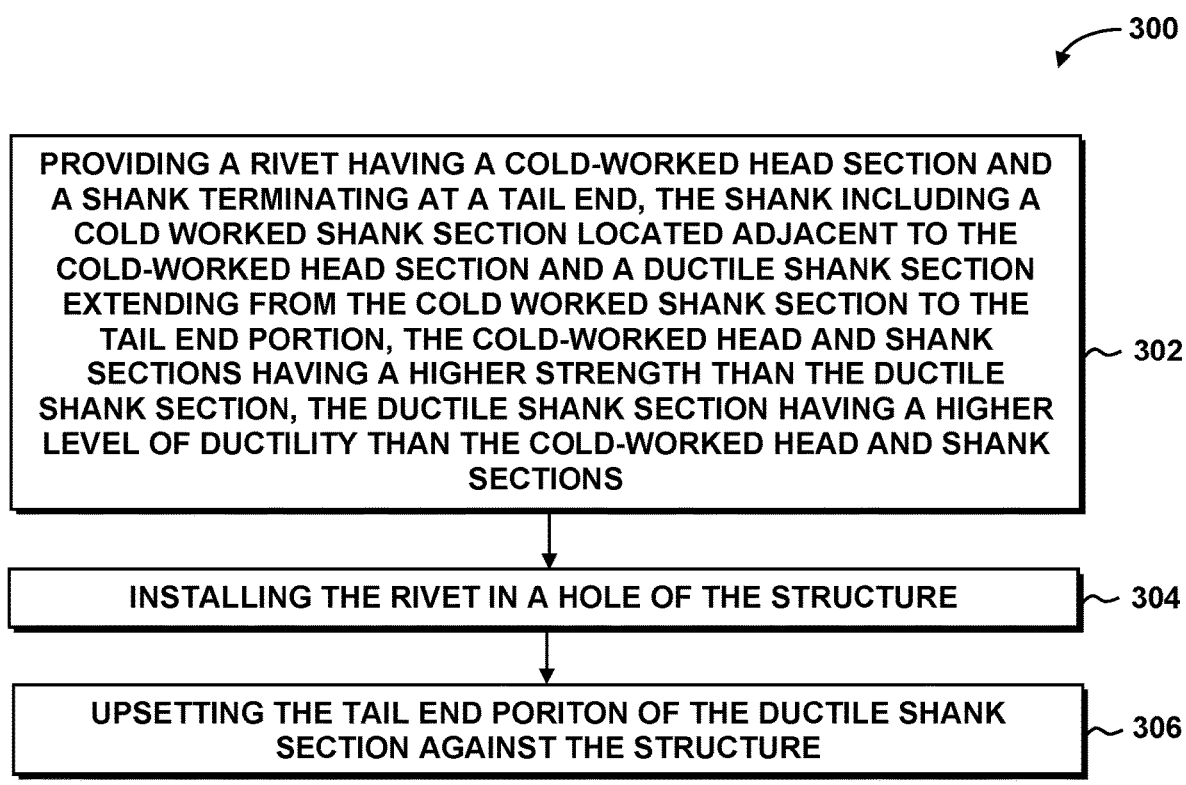
FIG. 8 is a flow chart illustrating one or more operations that may be included in a method of installing a one-piece fastener into a structure wherein the one-piece fastener has a cold-worked head section, a cold-worked shank section, and a ductile shank section.
Figure 9:
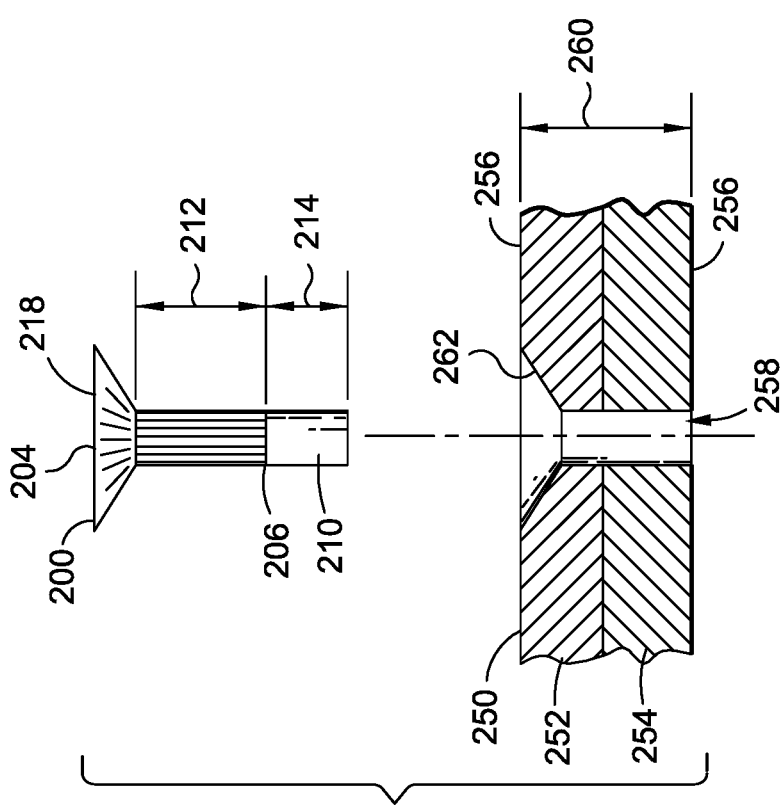
FIG. 9 is a schematic side view of a one-piece fastener having cold-worked head and shank sections prior to installation of the fastener in a hole extending through components of a structure.

Referring to FIG. 8 with additional reference to FIGS. 9-13, shown in FIG. 8 is a flow chart illustrating an embodiment of a method 300 of installing a fastener 200 (FIG. 9) in a structure 250 (FIG. 9) wherein the fastener 200 has a cold-worked head section 204 (FIG. 9) and a cold-worked shank section 212 (FIG. 9) and a ductile shank section 214 (FIG. 9).

Step 302 of the method 300 of FIG. 8 includes providing the fastener 200. In the embodiment shown in FIG. 9, the fastener 200 comprises a flush head fastener 220 as described above. The structure 250 comprises a first component 252 and a second component 254. The first component 252 has a countersink 262 that may be formed complementary to the flush head fastener 220. The shank 206 includes the cold-worked shank section 212 located adjacent to the cold-worked head section 204 and further includes the ductile shank section 214 extending from the cold-worked head section 204 and the cold-worked shank section 212 to the tail end portion 210. As indicated above, the cold-worked head section 204 and cold-worked shank section 212 may have a higher strength than the ductile shank section 214. For example, the cold-worked head section 204 and cold-worked shank section 212 may have a shear strength that is higher than the shear strength of the ductile shank section 214. The ductile shank section 214 may have a higher level of ductility than the cold-worked head section 204 and cold-worked shank section 212.

Figure 10:
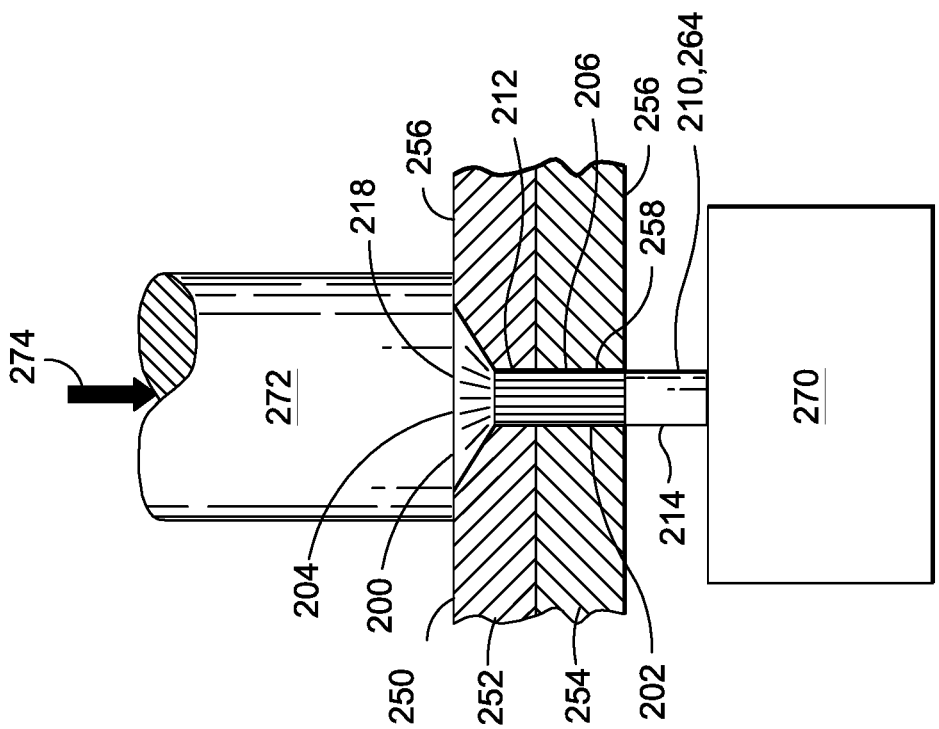
FIG. 10 is a schematic side view of the one-piece fastener installed in the hole and illustrating the cold-worked head and shank sections having a length that is substantially equivalent to a length of the hole and further illustrating the ductile shank section at a tail end portion of the fastener extending out of the hole in a pre-installed or pre-upset condition.

Step 304 of the method 300 of FIG. 8 may include installing the fastener 200 in the hole 258 formed in the structure 250 as shown in FIG. 10. The cold-worked head section 204 and cold-worked shank section 212 may have a length that is substantially equivalent to the length 260 (FIG. 9) of the hole 258 when the head is seated against the structure 250. In this manner, the shear load-carrying capability of the fastener 200 is maximized. FIG. 10 further illustrates a tool 272 such as a rivet gun disposed against the head of the fastener 200 and a bucking bar 270 disposed against the tail end portion 210 of the fastener 200. The tail end portion 210 is shown in a pre-upset condition 264 prior to application of an upsetting force 274 on the fastener 200 by the tool 272 and the bucking bar 270.

Step 306 of the method 300 of FIG. 8 may include upsetting the tail end portion 210 of the fastener 200 by applying the upsetting force 274 to the fastener 200. Referring to FIG. 11, the upsetting force 274 may be applied by a series of impacts provided by the rivet gun. The impacts are preferably of a magnitude causing successively increasing plastic deformation of the tail end portion 210 against the surface 256 of the structure 250, which is illustrated in the intermediate upset condition 266 in FIG. 11. Although FIGS. 10-12 illustrates the upsetting of the tail end portion 210 being performed by a tool 272, such as a rivet gun and a bucking bar 270, any device, mechanism, or process may be used to upset the tail end portion 210 including, but not limited to, a rivet compression tool, a rivet crimping tool, or other manual or automated tools or devices.

Referring to FIG. 12, shown is the tail end portion 210 of the fastener 200 deformed into the final post-upset condition 268. Advantageously, the relatively high level of ductility in the ductile shank section 214 reduces the amount of force required to upset the tail end portion 210, which may correspond to a reduction in the amount of rework needed or time required to install the fastener 200. FIG. 13 illustrates the final installation of the fastener 200 with the tool (e.g., rivet gun) and the bucking bar 270 removed.

Figure 14:
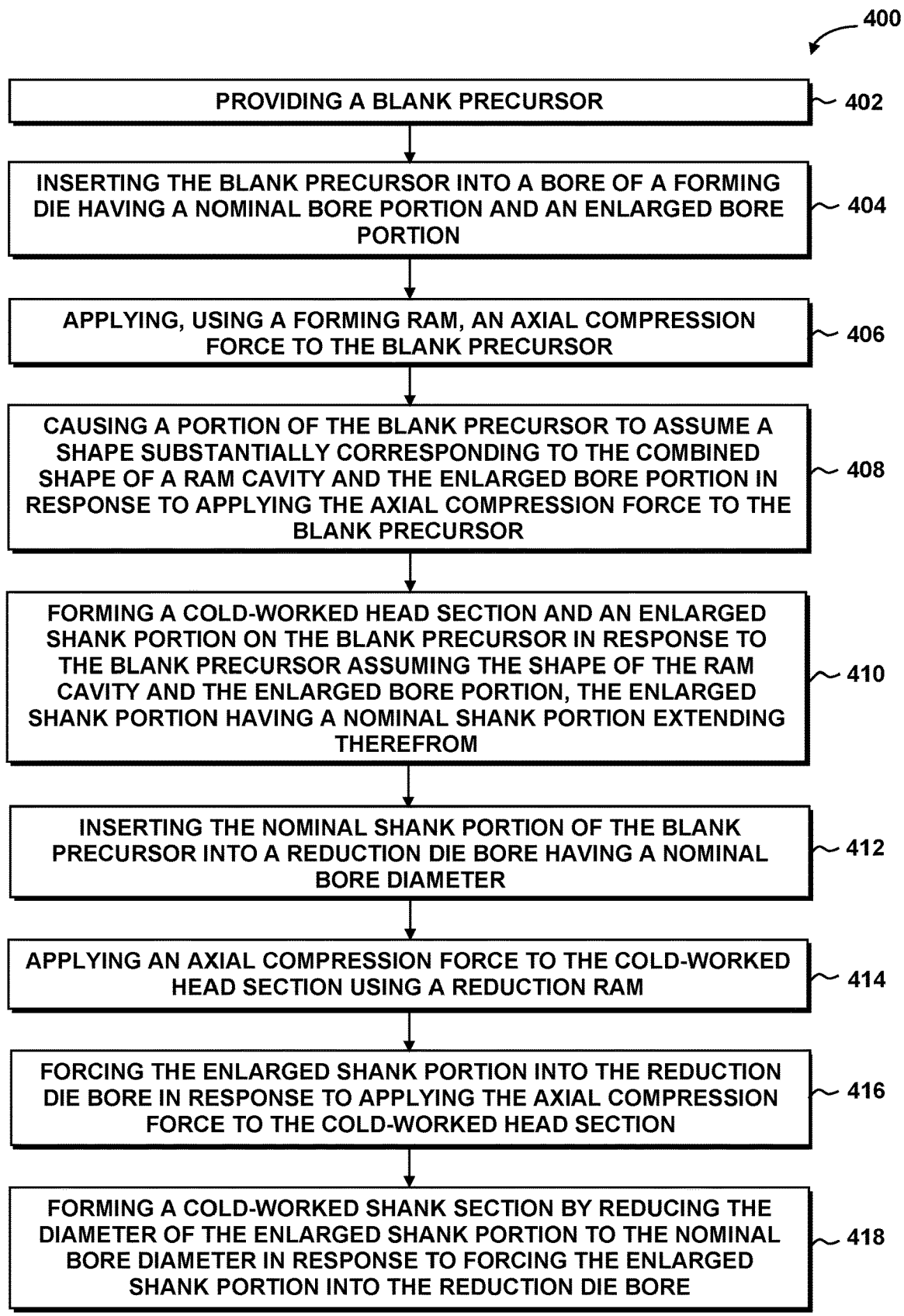
FIG. 14 is a flow chart illustrating one or more operations that may be included in a method of forming a one-piece fastener having a cold-worked head section and a cold-worked shank section.

Referring to FIG. 14 with additional reference to FIGS. 15-32, shown in FIG. 14 is a flow chart illustrating an embodiment of a method 400 of forming a fastener 200 having a cold-worked head section 204 and cold-worked shank section 212 and a ductile shank section 214. The cold-worked head section 204 and cold-worked shank section 212 may be formed using a system 10 which may include dies 50, 50a, 100, 100a and rams 80, 130 as shown in FIGS. 16, 20, 25 and 29 and described below. The method 400 of forming the fastener 200 is described in the context of a forming a flush head fastener 218 as illustrated in FIGS. 15-23 and in the context of forming a protruding head fastener 224 as illustrated in FIGS. 24-32.

Figure 24:
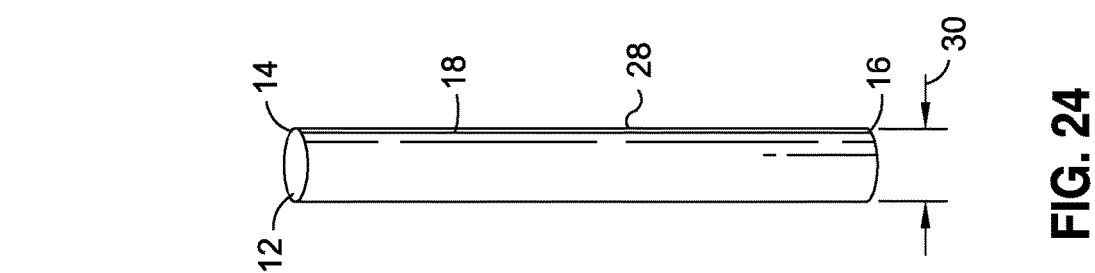
FIG. 24 is a perspective view of a blank precursor that may be formed into a protruding head, one-piece fastener having the cold-worked head and shank sections as shown in the sequence of operations illustrated in FIGS. 25-32.
Figure 33:
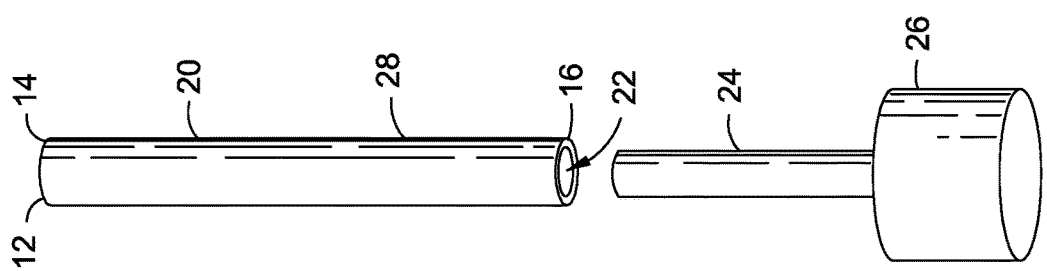
FIG. 33 is a perspective illustration of a semi-tubular blank precursor and an insert tool as may be implemented for stabilizing a tubular cavity of the blank precursor during the forming of the blank precursor into a final configuration of a one-piece fastener in a sequence of operations similar to the sequence illustrated in FIGS. 2-9.

Step 402 of the method 400 of FIG. 14 may include providing a blank precursor 12 having opposing first and second ends 14, 16 as shown in FIGS. 15 and 24. The blank precursor 12 may be provided as a rod or generally elongated cylindrical member. Although shown as having a generally solid 18 configuration, the blank precursor 12 may optionally be provided as a semi-tubular blank precursor 20 having a tubular cavity 22 extending at least partially into the blank precursor 12 as shown in FIG. 33 and described in greater detail below. The blank precursor 12 may have a generally constant nominal shank diameter 30 (FIG. 15) extending along the length of the blank precursor 12. However, the blank precursor 12 may be provided with a shank diameter 208 that may vary along the length of the blank precursor 12.

The blank precursor 12 in FIGS. 15 and 24 may advantageously be formed of a material having a relatively small average grain size as described above. For example, the blank precursor 12 may be formed of titanium material or titanium-alloy material having an ultra-fine grain such as an average grain size of less than approximately 10,000 nanometers or, more preferably, an average grain size of less than approximately 300 nanometers such as between approximately 100 to 300 nanometers. However, the blank precursor 12 may be formed of material having relatively course grain size (e.g., greater than approximately 100,000 nanometers) or a material have a fine grain size (e.g., less than approximately 100,000 nanometers). As described above, the material may also optionally comprise any metallic material including, but not limited to, aluminum, aluminum-alloy, steel, steel-alloy, stainless steel, and titanium or titanium-alloy materials.

Figure 25:
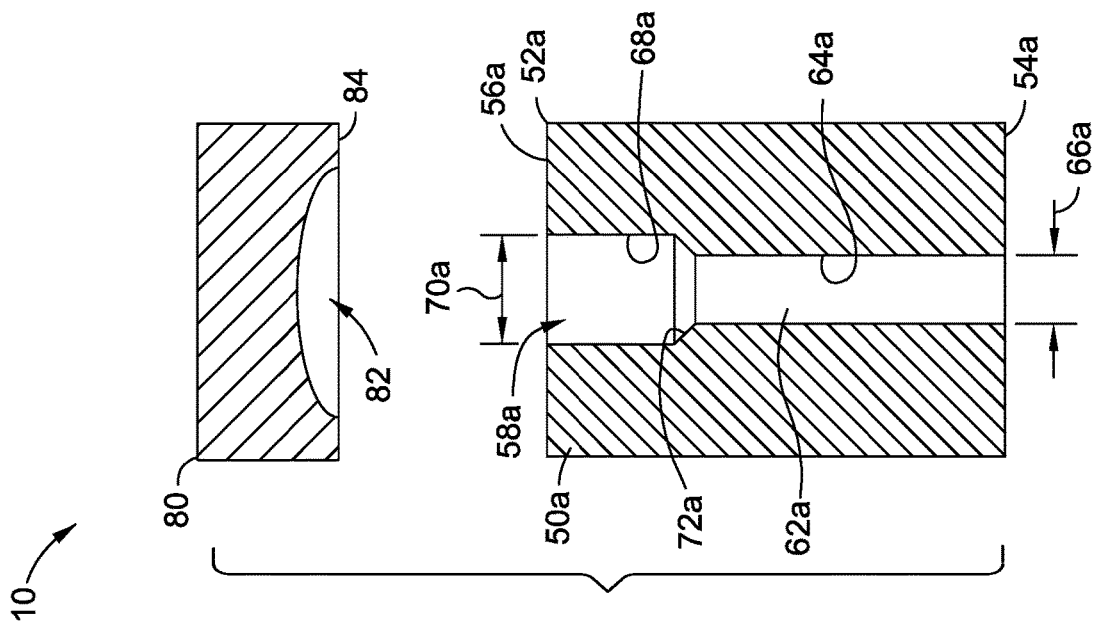
FIG. 25 is a schematic side view of a forming die and a forming ram for use in cold-working the protruding head and forming the enlarged shank portion on the blank precursor.

Referring to FIG. 16, a forming die 50 and a forming ram 80 of the system 10 may be provided for providing the blank precursor 12 with a countersunk head 36 for forming a flush head fastener 218 (FIGS. 1-3). The forming die 50 may have opposing first and second ends 52, 54. In FIG. 16, the forming die 50 may include a forming die cavity 58 having a forming die countersink 60 for forming a corresponding countersunk head 36 (FIG. 19) on the blank precursor 12. FIG. 25 illustrates a forming die 50a and a forming ram 80 for forming a protruding head 38 (FIG. 28) on the blank precursor 12. The forming die 50a may have opposing first and second ends 52a, 54a. As shown in FIG. 25, the forming die 50a may include a forming die cavity 58a, which may be devoid of a countersink 60 such that the forming die 50a may be used for forming a protruding head fastener 224 (FIGS. 4-7).

In FIGS. 16 and 25, the forming die 50, 50a and forming ram 80 may be formed of a relatively high-strength material that may be compatible with the material composition of the blank precursor 12. The forming die 50, 50a may have a forming die cavity 58, 58a. The forming die cavity 58, 58a may comprise a bore 62, 62a that may be formed in the forming die 50, 50a. The bore 62, 62a may include a nominal bore portion 64, 64a (FIGS. 16 and 25) having a nominal bore diameter 66, 66a that may transition to an enlarged bore portion 68, 68a having an enlarged bore diameter 70, 70a. The nominal bore portion 64, 64a may transition to the enlarged bore portion 68, 68a via an enlarged bore countersink 72, 72a.

Figure 32:
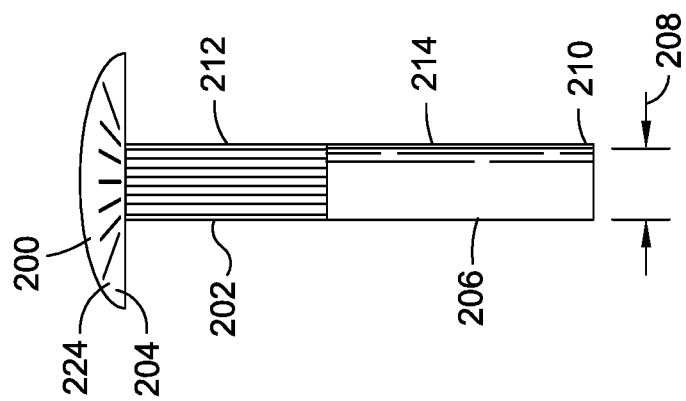
FIG. 32 is a schematic side view of the final configuration of the protruding head, one-piece fastener having the cold-worked head and shank sections formed thereon as a result of the application of the axial compression force.

The enlarged bore portion 68, 68a may be concentric with the nominal bore portion 64, 64a and may be open on one end of the forming die 50, 50a. The nominal bore portion 64, 64a may open to an end of the forming die 50, 50a opposite the end of the enlarged bore portion 68, 68a. However, the nominal bore portion 64, 64a may terminate inside the forming die 50, 50a and does not necessarily extend to an end of the forming die 50, 50a. The nominal bore portion 64, 64a of the forming die 50, 50a may have a nominal bore diameter 66, 66a that may substantially correspond to or is approximately equivalent to the nominal shank diameter 30 (FIG. 15) of the blank precursor 12 (FIG. 15). The nominal shank diameter 30 of the blank precursor 12 may be approximately equivalent to the final shank diameter 208 (FIGS. 23 and 32) of the fastener 200 (FIGS. 23 and 32) in the cold-worked shank section 212 (FIGS. 23 and 32) and in the ductile shank section 214 (FIGS. 23 and 32).

Figure 26:
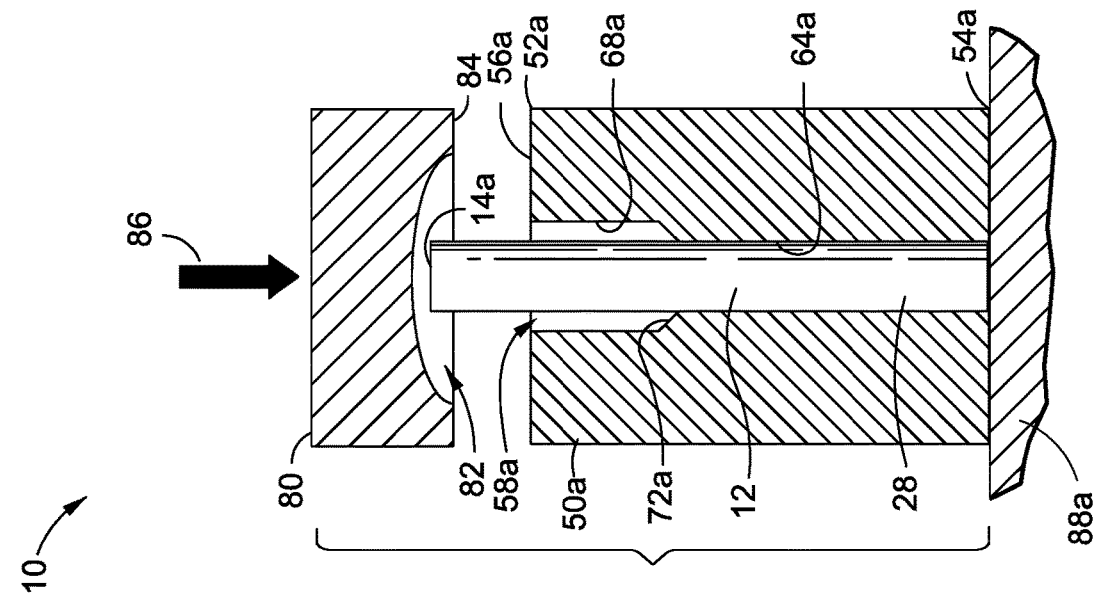
FIG. 26 is a schematic side view of the blank precursor installed in the forming die prior to the application of an axial compression force to the blank precursor by the forming ram.

The forming ram 80 shown in FIGS. 16 and 25 may have a ram cavity 82 configured to receive the end of the blank precursor 12 (FIGS. 17 and 26). The ram cavity 82 may be concave as shown or the ram cavity 82 may be provided with an alternative shape. The forming ram 80 may have a surface 84 configured to contact a mating surface 56, 56a of the forming die 50, 50a. However, the forming die 50, 50a and forming ram 80 may be provided with alternative mating geometry and are not limited to surfaces configured to contact one another. In an embodiment, the forming die 50, 50a and forming ram 80 may be configured to form the blank precursor 12 without contacting one another.

Step 404 of the method 400 of FIG. 14 may include inserting the blank precursor 12 (FIGS. 17 and 26) into the nominal bore portion 64, 64a (FIGS. 17 and 26) of the forming die 50, 50a as shown in FIGS. 17 and 26. In the embodiments shown, the forming die 50, 50a may be supported on a backing device 88. The blank precursor 12 may have a length such that when the blank precursor 12 is inserted into the nominal bore portion 64, 64a and the blank precursor 12 contacts the backing device 88 (FIGS. 17 and 26), the blank precursor 12 protrudes from the enlarged bore portion 68, 68a (FIGS. 17 and 26) of the forming die 50, 50a.

Step 406 of the method 400 of FIG. 14 may include applying an axial compression force 86 to the blank precursor 12 as shown in FIGS. 17 and 26. The forming ram 80 may apply the axial compression force 86 to the portion of the blank precursor 12 protruding from the forming. The blank precursor 12 may be supported by the backing device 88 during the application of the axial compression force 86.

Figure 18:
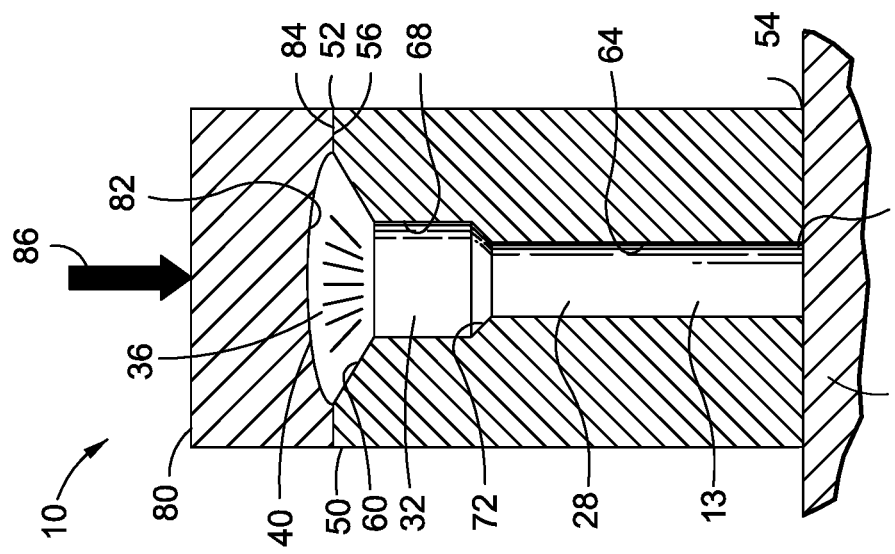
FIG. 18 is a schematic side view of the forming ram in contact with the forming die after application of the axial compression force and illustrating a portion of the blank precursor assuming a shape substantially corresponding to a shape of the forming die and forming ram to form the cold-worked head section and the enlarged shank portion of the blank precursor.
Figure 27:
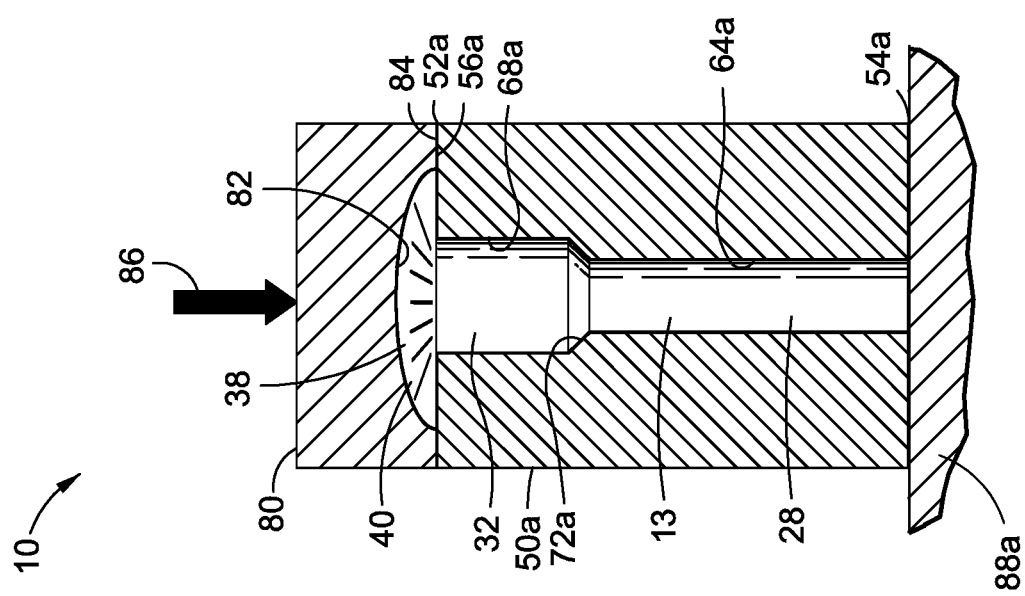
FIG. 27 is a schematic side view of the forming ram in contact with the forming die after application of the axial compression force and illustrating a portion of the blank precursor assuming a shape substantially corresponding to a shape of the forming die and forming ram to form the cold-worked head section and the enlarged shank portion of the blank precursor.

Step 408 of the method 400 of FIG. 14 may include contacting the forming ram 80 with the forming die 50, 50a and causing a portion of the blank precursor 12 to substantially fill the ram cavity 82 and the enlarged bore portion 68, 68a as shown in FIGS. 18 and 27. In this regard, the application of the axial compression force 86 (FIG. 17) may cause the portion of the blank precursor 12 to assume a shape substantially corresponding to the combined shape of the ram cavity 82 and the enlarged bore portion 68, 68a (FIG. 18).

Figure 28:
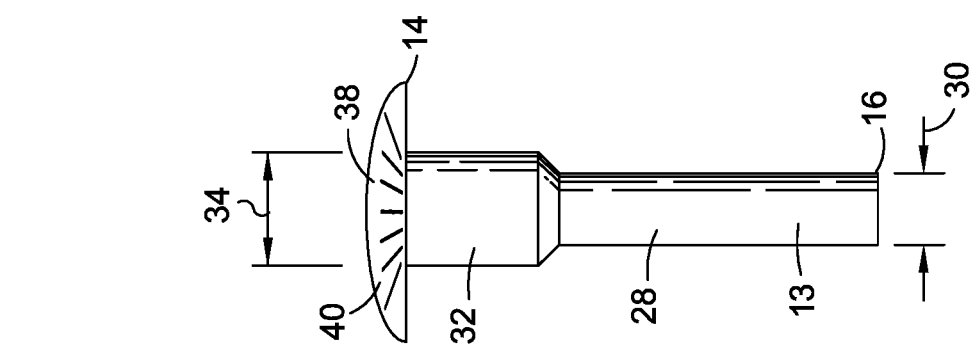
FIG. 28 is a schematic side view of an intermediarily-formed blank precursor having an enlarged shank portion formed thereon as a result of the application of the axial compression force.

Step 410 of the method 400 of FIG. 14 may include forming a head 40 and an enlarged shank portion 32 on the intermediarily-formed blank precursor 13 as shown in FIGS. 19 and 28 in response to applying the axial compression force 86 (FIGS. 18 and 27) to the intermediarily-formed blank precursor 13. In this regard, the intermediarily-formed blank precursor 13 may include the enlarged shank portion 32 located adjacent to the cold-worked head section 204 with the nominal shank portion 28 extending from the enlarged shank portion 32. As indicated earlier, the nominal shank portion 28 may be approximately equivalent to the original diameter of the cylindrical blank precursor 12 illustrated in FIG. 15.

Figure 20:
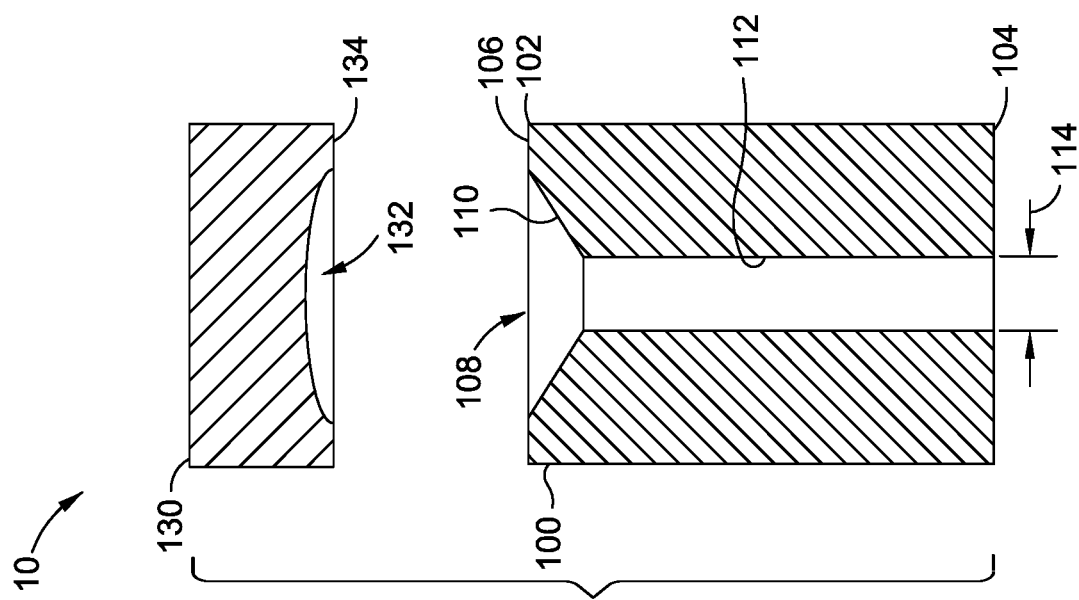
FIG. 20 is a schematic side view of a final reduction die having a countersink and a reduction ram for use in cold-working the enlarged shank portion on the blank precursor.
Figure 29:
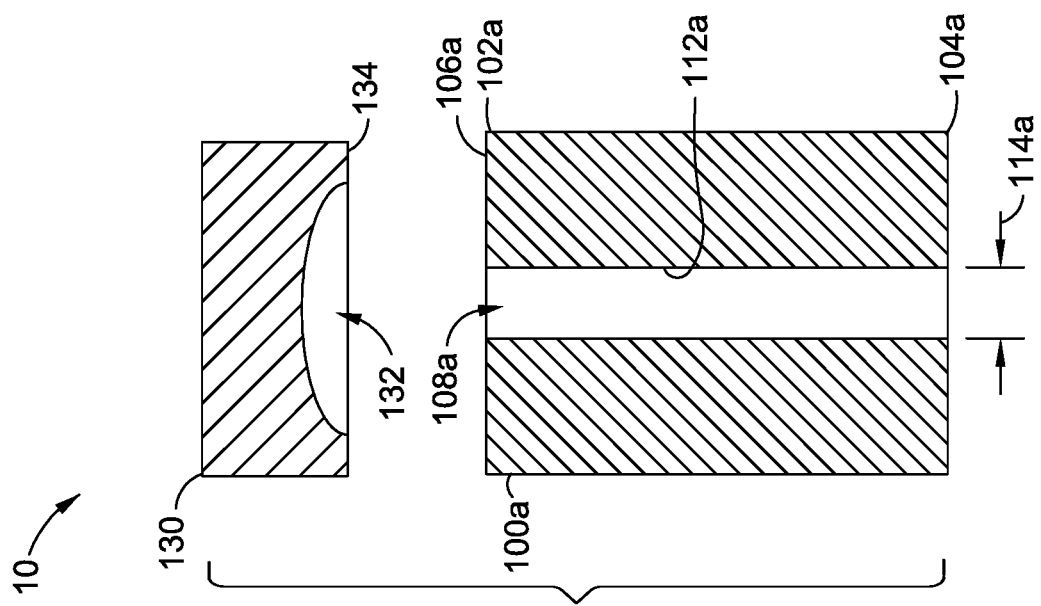
FIG. 29 is a schematic side view of a final reduction die and reduction ram for use in cold-working the enlarged shank portion on the intermediarily-formed blank precursor.

Referring to FIGS. 20 and 29, shown is a final reduction die 100, 100a and a reduction ram 130 for forming the intermediarily-formed blank precursor 13 (FIGS. 19 and 28) into a fastener 200 (FIG. 23) having a cold-worked head section 204 and cold-worked shank section 212 (FIGS. 23 and 32). The reduction ram 130 (FIG. 20) may have opposing first and second ends 102, 102a, 104, 104a and may include a final reduction die cavity 108, 108a having a bore 112, 112a extending completely or partially through the final reduction die 100, 100a. The reduction ram 130 may have a surface 134 configured to contact a mating surface 106, 106a of the final reduction die 100, 100a. The reduction ram 130 may have a ram cavity 132 which may be formed complementary to the shape of the ram cavity 82 (FIGS. 16 and 25) of the forming ram 80 (FIGS. 16 and 25). The reduction ram 130 may be configured to receive the end of the intermediarily-formed blank precursor 13. The final reduction die 100 (FIG. 20) may include a final reduction die countersink 110 (FIG. 20) corresponding to the forming die countersink 60 (FIG. 16) formed in the forming die 50 (FIG. 16). The bore 112, 112a in each one of the final reduction dies 100, 100a shown in FIGS. 20 and 29 may have a bore diameter 114, 114a that may be substantially equivalent to the nominal shank diameter 30 of the nominal shank portion 28 of the blank precursor 12 illustrated in FIGS. 15 and 24. The reduction ram 130 in FIGS. 20 and 29 may be configured substantially similar to the forming ram 80 illustrated in FIGS. 17 and 26 and described above.

Figure 31:
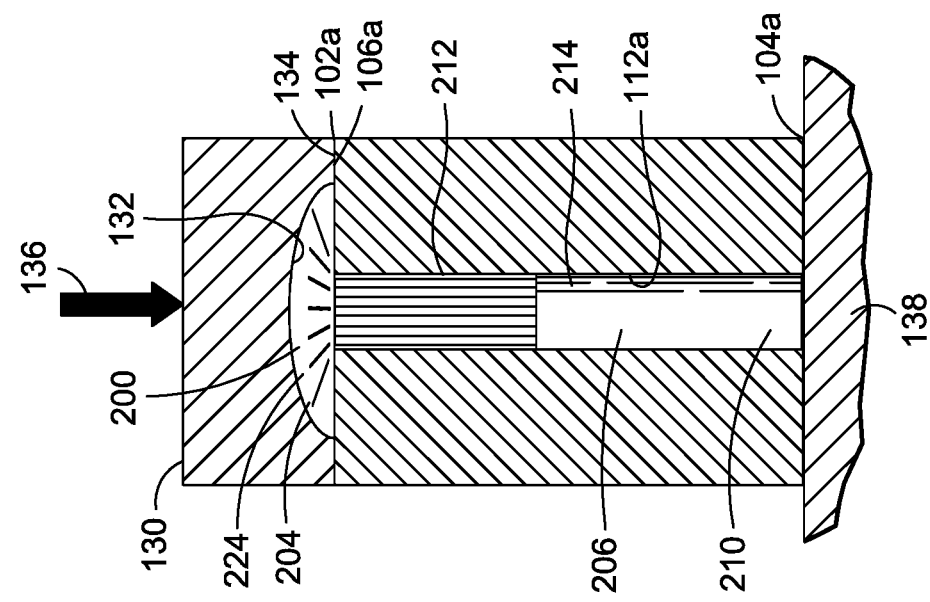
FIG. 31 is a schematic side view of the reduction ram in contact with the final reduction die after application of the axial compression force and the reduction in the size of the enlarged shank portion to form the cold-worked shank section of a protruding head, one-piece fastener.
Figure 30:
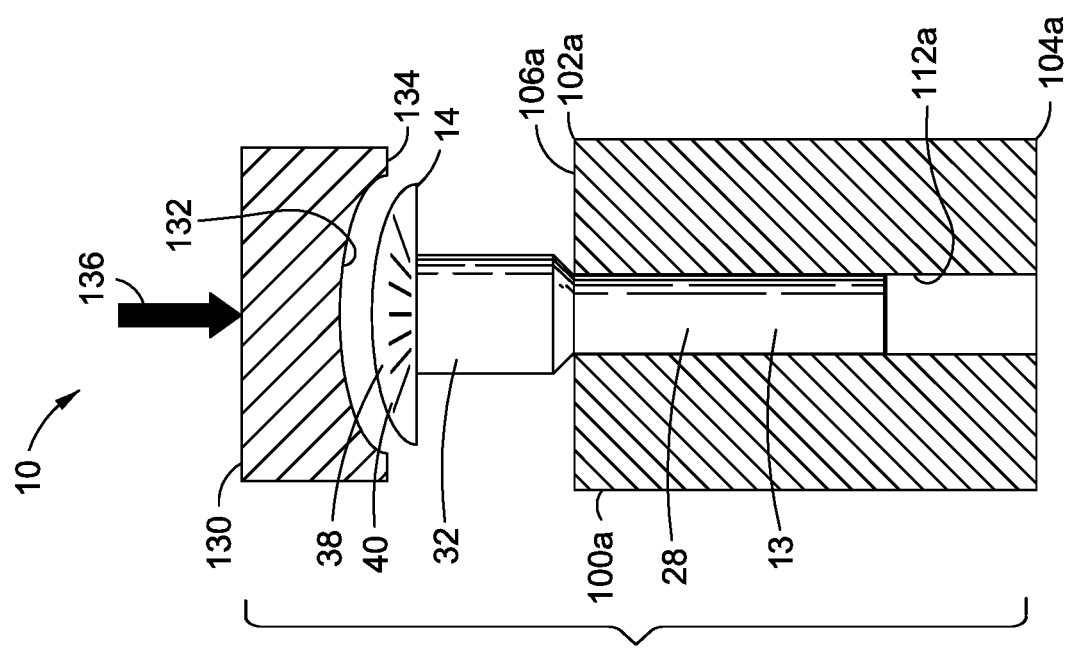
FIG. 30 is a schematic side view of the intermediarily-formed blank precursor installed within the final reduction die prior to the application of an axial compression force to the protruding head by the reduction ram.

Step 412 of the method 400 of FIG. 14 may include inserting the nominal shank portion 28 of the intermediarily-formed blank precursor 13 into the bore 112, 112a of the final reduction die 100, 100a as shown in FIGS. 21 and 30. The final reduction die 100, 100a may be supported on a backing device 138 (FIGS. 22 and 31). The enlarged shank portion 32 may have an enlarged shank diameter 34 (FIGS. 19 and 28) that may be larger than the diameter 114, 114a of the final reduction die bore 112, 112a. The enlarged shank portion 32 may be disposed above the bore 112, 112a of the final reduction die 100, 100a. The intermediarily-formed blank precursor 13 may include a tapered transition between the nominal shank portion 28 and the enlarged shank portion 32 to facilitate entry of the enlarged shank portion 32 into the bore 112, 112a of the final reduction die 100, 100a as described below.

Step 414 of the method 400 of FIG. 14 may include applying an axial compression force 136 to the intermediarily-formed blank precursor 13 as shown in FIGS. 22 and 31. The final reduction die 100, 100a shown in each of FIGS. 22 and 31 may optionally be supported on the backing device 88 (FIGS. 22 and 31) during the application of the axial compression force 136. The reduction ram 130 may apply the axial compression force 136 to the head 40 of the intermediarily-formed blank precursor 13.

Step 416 of the method 400 of FIG. 14 may include urging or forcing the enlarged shank portion 32 into the bore 112, 112a of the final reduction die 100, 100a as shown in FIGS. 22 and 31. The axial compression force 136 may be applied to the intermediarily-formed blank precursor 13 until the reduction ram 130 contacts the final reduction die 100, 100a.

Step 418 of the method 400 of FIG. 14 may include forming the cold-worked shank section 212 by reducing the cross-sectional area of the enlarged shank portion 32 to the cross-sectional area of the final reduction die bore 112, 112a as shown in FIGS. 22 and 31. In this regard, the method may include reducing the diameter of the enlarged shank portion 32 of the intermediarily-formed blank precursor 13 to the diameter 114, 114a of the final reduction die bore 112, 112a in response to forcing the enlarged shank portion 32 into the final reduction die bore 112, 112a. In this manner, Step 418 may comprise forming the intermediarily-formed blank precursor 13 of FIGS. 22 and 31 into a fastener 200 (FIGS. 23 and 32) having a cold-worked head section 204 and cold-worked shank section 212 (FIGS. 23 and 32) and a ductile shank section 214 (FIGS. 23 and 32). The ductile shank section 214 may extend from the cold-worked shank section 212 to the tail end portion 210 (FIGS. 23 and 32) of the fastener 200. The intermediarily-formed blank precursor 13 may be formed into a flush head fastener 218 in FIG. 23. Alternatively, the intermediarily-formed blank precursor 13 may be formed into a protruding head fastener 200 in FIG. 32.

Figure 35:
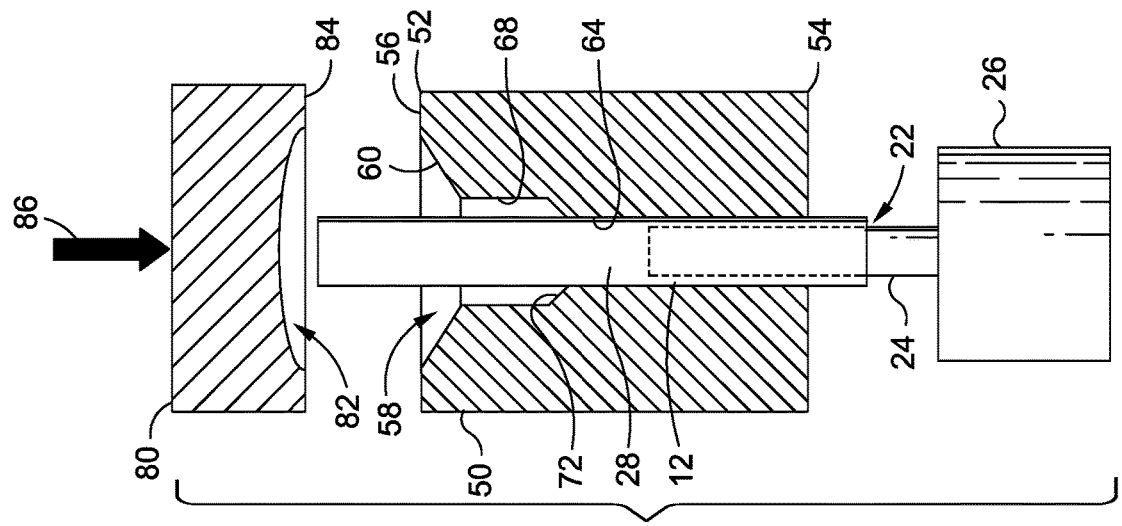
FIG. 35 is a schematic side view of the semi-tubular blank precursor installed in the forming die and the insert installed in the tubular cavity prior to the application of the axial compression force to the semi-tubular blank precursor.
Figure 34:
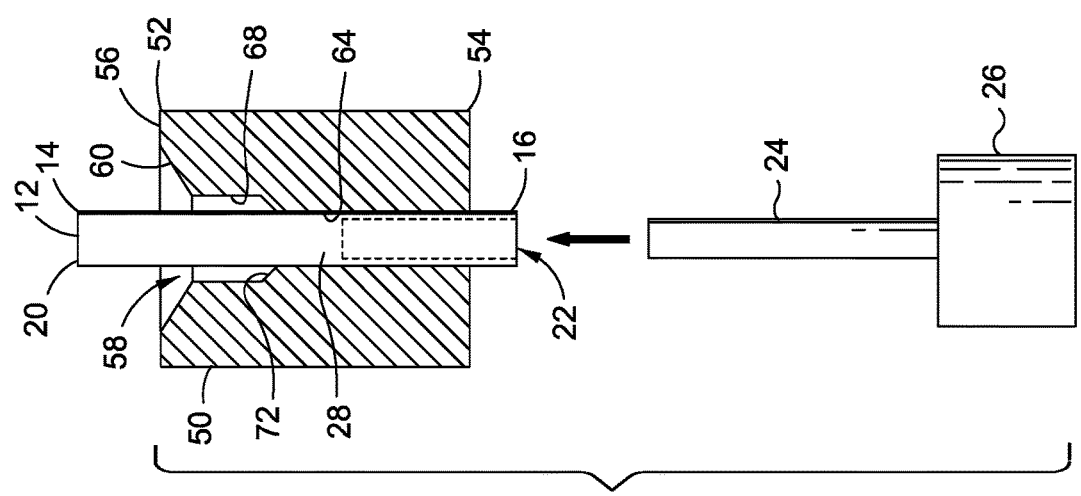
FIG. 34 is a schematic side view of the semi-tubular blank precursor installed in the forming die and the insert positioned below the tubular cavity of the blank precursor.

Referring to FIGS. 33-35, shown are the preliminary steps for forming a semi-tubular blank precursor 20 into a semi-tubular fastener 200 (FIG. 6). FIG. 33 illustrates a semi-tubular blank precursor 20 having a generally hollow tubular cavity 22 extending at least partially into an end of the blank precursor 12. An insert tool 24 having a shaft formed complementary to the hollow tubular cavity 22 may be provided for stabilizing the semi-tubular blank precursor 20. The insert tool 24 may stabilize the hollow tubular cavity 22 of the semi-tubular blank precursor 20 against collapse or deformation during the process of forming the semi-tubular blank precursor 20 into a semi-tubular fastener 200 having a cold-worked head section 204 and a cold-worked shank section 212 (FIG. 6).

FIG. 34 shows the semi-tubular blank precursor 20 installed in the forming die 50 and the insert tool 24 positioned below the tubular cavity 22 of the semi-tubular blank precursor 20. The insert tool 24 may optionally include a boss 26 from which the insert tool 24 may extend. The boss 26 may be provided for handling the insert tool 24.

FIG. 35 shows the blank precursor 12 installed in the forming die 50 and the insert tool 24 installed in the tubular cavity 22 prior to the application of the axial compression force 86 to the blank precursor 12. The insert tool 24 may be mechanically retained in position during the application of the axial compression force 86 to the blank precursor 12 to stabilize the hollow tubular cavity 22 when forming the semi-tubular blank precursor 20 (FIG. 33) into a semi-tubular fastener 200 (FIG. 6) having a cold-worked head section 204 and cold-worked shank section 212 (FIG. 6).

Figure 36:
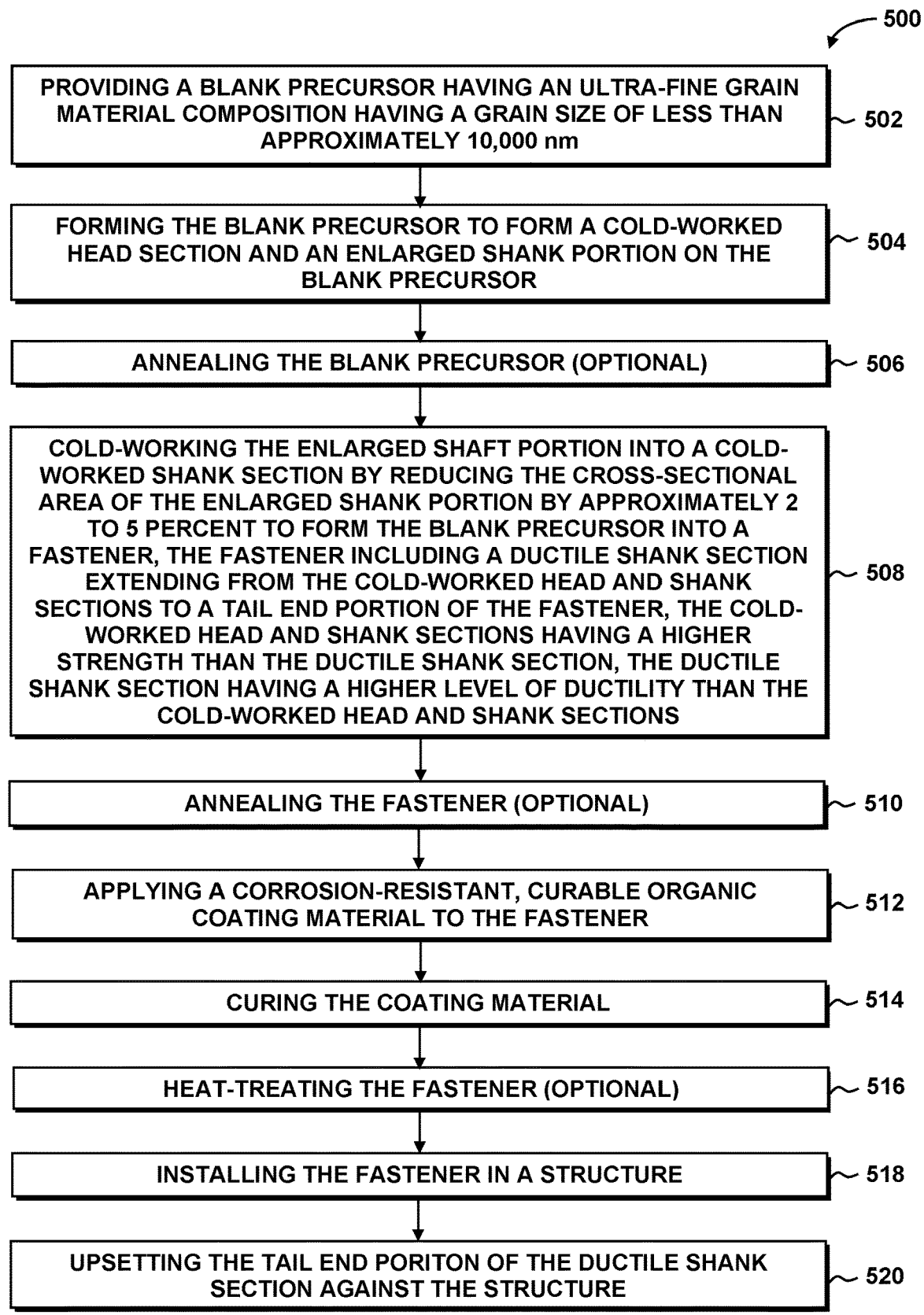
FIG. 36 is a flow chart illustrating one or more operations that may be included in a method of forming a one-piece fastener having the cold-worked head and shank sections and including one or more optional heat treatment steps and the application of an organic coating to the one-piece fastener.

Referring now to FIG. 36, shown is a further embodiment of a method 500 for forming a fastener 200 (FIG. 23) with a cold-worked head section 204 and cold-worked shank section 212 (FIG. 23). The method 500 may include one or more of the steps described above with regard to forming a blank precursor 12 (FIG. 15) into a fastener 200 and may include additional steps for improving the performance and strength properties of the fastener 200.

Step 502 of the method 500 of FIG. 36 may include providing a blank precursor 12 (FIG. 15) having a desired grain size. For example, Step 502 may comprise providing the blank precursor 12 having an ultra-fine grain material composition having a grain size of less than approximately 10,000 nanometers although larger grain size material may be used as described above.

Step 504 of the method 500 of FIG. 36 may include forming a cold-worked head section 204 and an enlarged shank portion 32 of an intermediarily-formed blank precursor 13 (FIG. 19) and which may comprise cold-working the intermediarily-formed blank precursor 13 during the forming step. In addition to forming the cold-worked head section 204 and the enlarged shank portion 32, Step 504 may comprise imparting improved strength to the cold-worked head section 204, such as improved tension strength, due to the cold-work produced during the forming process shown in FIGS. 18 and 27.

Step 506 of the method 500 of FIG. 36 may comprise the optional step of annealing the intermediarily-formed blank precursor 13 (FIG. 21) prior to forming the cold-worked shank section 212 (FIG. 22). The annealing step may include heating the intermediarily-formed blank precursor 13 to a pre-determined temperature and holding the temperature for a pre-determined period of time. The annealing may optionally be performed to reduce or eliminate residual stress in the intermediarily-formed blank precursor 13 and/or improve one or more properties of the intermediarily-formed blank precursor 13, such as the strength properties of the intermediarily-formed blank precursor 13.

Step 508 of the method 500 of FIG. 36 may include cold-working a localized area (e.g., the enlarged shank portion 32—FIG. 19) of the intermediarily-formed blank precursor 13 to form a fastener 200 (FIG. 23) having a cold-worked shank section 212 as described above and illustrated in FIGS. 23 and 32. In an embodiment, the cold-working process may comprise reducing the cross-sectional area of the enlarged shank portion 32 to form the cold-worked shank section 212. Advantageously, the cold-worked head section 204 and cold-worked shank section 212 may have a higher strength than the ductile shank section 214. The ductile shank section 214 may have a higher level of ductility than the cold-worked head section 204 and cold-worked shank section 212.

Step 510 of the method 500 of FIG. 36 may comprise the optional step of annealing the fastener 200 after forming the cold-worked head section 204 (FIG. 23) and cold-worked shank section 212 (FIG. 23) in the fastener 200 (FIG. 23). The annealing step may comprise further heat-treating the fastener 200 by heating the fastener 200 to a pre-determined elevated temperature and holding at the temperature for a pre-determined period of time as a means to reduce or eliminate residual stress that may develop in the fastener 200 during the cold-working process. The annealing step may also improve the mechanical properties of the fastener 200.

Step 512 of the method 500 of FIG. 36 may include applying a corrosion-resistant coating 202 (FIG. 23) to the fastener 200 (FIG. 23). In an embodiment described above, the coating 202 may comprise a curable, corrosion-resistant organic coating material. The coating 202 may be applied to the fastener 200 such as by spraying, brushing, or using an alternative method. The coating 202 material may preferably have a thickness of approximately 0.0003 to 0.0005 inch in thickness after curing although other thicknesses of the coating 202 are possible.

Step 514 of the method 500 of FIG. 36 may include curing the applied coating material such as by increasing the temperature of the environment of the coated-fastener 200 to a pre-determined curing temperature and holding for a pre-determined period of time. The increase in temperature of the coating 202 may result in evaporation of the solvent from the applied coating material.

Step 516 of the method 500 of FIG. 36 may comprise the optional step of final heat-treating the fastener 200 (FIG. 23) for a pre-determined period of time at a pre-determined temperature regime to increase the fastener 200 strength properties. In an embodiment, the heat-treating of the fastener 200 may be performed concurrently with the curing of the coating material to reduce total time and cost for fabricating the fastener 200. Step 516 may optionally be combined with Step 514 to cure the applied material coating and thermally treat the fastener 200.

Step 518 of the method 500 of FIG. 36 may include installing the fastener 200 (FIG. 23) in a structure 250 as described above and illustrated in FIGS. 9-13. The fastener 200 may be formed as a flush head fastener 218 (FIG. 9) having a cold-worked head section 204 (FIG. 9) and cold-worked shank section 212 (FIG. 9) having a length that is substantially equivalent to the total thickness of the structure 250 (FIG. 9). Alternatively, the fastener 200 may be formed as a protruding head fastener 224 (FIG. 4) having a cold-worked shank section 226a (FIG. 4) having a length that is substantially equivalent to the total thickness of the structure 250 (FIG. 9). A protruding head fastener 224 may provide maximum shear capability to the structural joint formed by the fastener 224 installation.

Step 520 of the method 500 of FIG. 36 may include upsetting the tail end portion 210 of the ductile shank section 214 against the structure 250 as illustrated in the sequence of steps shown in FIGS. 10-12. The tail end portion 210 may be adequately deformed against a component of the structure 250 during upsetting of the tail end portion 210. Advantageously, the high level of ductility in the ductile shank section 214 provides improved drivability or upsetting of the tail end portion 210 of the fastener 200, which results in improved quality of fastener installations, and clamp-up of components being fastened by the fastener 200. The improved clamp-up may improve the joint fatigue and tensile strength levels of a structural joint formed by the fastener 200 installation.

It should be noted that although the process for forming a fastener 200 with cold-worked head and shank sections 204, 212 is described above in the context of using a set of dies (i.e., a forming die 50 and a final reduction die 100) to form the cold-worked head section 204 and cold-worked shank section 212, other methods may be implemented. For example, the cold-worked head and shank sections 204, 212 may be formed by extruding, rolling, swaging, or any other operation that may impart the desired level of local cold-working (e.g., 2 to 5 percent reduction in cross-sectional area).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of forming a semi-tubular fastener, the method comprising steps of:
    inserting a semi-tubular blank precursor into a bore of a forming die, comprising an enlarged bore portion, and wherein:
        the semi-tubular blank precursor comprises a hollow tubular cavity extending at least partially into the semi-tubular blank precursor, and
        the semi-tubular blank precursor is formed of an ultra-fine grain titanium or titanium-alloy composition, having an average grain size of less than approximately 10 microns;
    inserting an insert tool into the hollow tubular cavity;
    applying a first axial compression force to the semi-tubular blank precursor after inserting the insert tool in the hollow tubular cavity;
    forming a cold-worked head section and an enlarged shank portion on the semi-tubular blank precursor, and wherein the enlarged shank portion corresponds to the enlarged bore portion, and the enlarged shank portion comprises a nominal shank portion, extending therefrom;
    inserting the nominal shank portion into a bore of a final reduction die;
    applying a second axial compression force to the enlarged shank portion;
    urging the enlarged shank portion into the bore of the final reduction die;
    reducing a cross-sectional area of the enlarged shank portion by approximately 2 to 5 percent; and
    forming a cold-worked shank section by reducing the cross-sectional area of the enlarged shank portion.

2. The method of claim 1, wherein the cross-sectional area of the enlarged shank portion
    is reduced by approximately 3.5 percent.

3. The method of claim 1 wherein:
    the cold-worked shank section has an ultimate shear strength of at least 100 ksi.

4. The method of claim 1 wherein:
    the ultra-fine grain titanium or titanium-alloy composition has the average grain size of less than approximately 500 nanometers.

5. The method of claim 1, further comprising:
    a step of forming the semi-tubular fastener as a protruding head semi-tubular fastener.

6. The method of claim 5, wherein the step of forming the semi-tubular fastener as the protruding head semi-tubular fastener comprises:

applying, using a forming ram comprising a ram cavity, the first axial compression force to the semi-tubular blank precursor in a manner causing a portion of the semi-tubular blank precursor to substantially assume a combined shape of the ram cavity and the enlarged bore portion.

7. The method of claim 1, further comprising a step of:
forming the semi-tubular fastener as a flush head semi-tubular fastener.

8. The method of claim 7 wherein the forming die comprises a countersink that opens into the enlarged bore portion, and the step of forming the semi-tubular fastener as the flush head semi-tubular fastener comprises:

applying the first axial compression force to the semi-tubular blank precursor in a manner causing a portion of the semi-tubular blank precursor to substantially assume a combined shape of the countersink and the enlarged bore portion.

9. The method of claim 1 further comprising:
supporting the forming die and the final reduction die on a backing device during respective application of the first axial compression force and second axial compression force.

10. The method of claim 1, further comprising at least one of:
annealing the semi-tubular blank precursor prior to forming the cold-worked shank section and the cold-worked head section; and
annealing the semi-tubular fastener after forming the cold-worked head section and the cold-worked shank section.

11. The method of claim 1, further comprising:
coating the semi-tubular fastener with a curable organic coating material that is corrosion-resistant.

12. The method of claim 11, wherein:
the curable organic coating material comprises a phenolic resin.

13. The method of claim 1, further comprising a step of:
final heat treating the semi-tubular fastener.

14. The method of claim 13, wherein:
the step of final heat treating the semi-tubular fastener is performed concurrently with coating the semi-tubular fastener with a curable organic coating material that is corrosion-resistant.

15. The method of claim 1, wherein:
the semi-tubular blank precursor comprises a generally constant nominal shank diameter extending along a length of the semi-tubular blank precursor.

16. The method of claim 1, wherein:
the semi-tubular blank precursor comprises a shank diameter that varies along a length of the semi-tubular blank precursor.

17. The method of claim 1, wherein:
the insert tool comprises a boss, from which the insert tool extends.

18. The method of claim 11, further comprising:
dissolving the curable organic coating material in a solvent prior to coating to the semi-tubular fastener with the curable organic coating material.

19. The method of claim 18, wherein:
the solvent is one of ethanol, toluene, or methyl ethyl ketone.

* * * * *